(12) United States Patent
Riley et al.

(10) Patent No.: US 6,247,087 B1
(45) Date of Patent: Jun. 12, 2001

(54) BUS SYSTEM FOR SHADOWING REGISTERS

(75) Inventors: Dwight D. Riley, Houston; David J. Maguire, Spring, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/036,634

(22) Filed: Mar. 6, 1998

Related U.S. Application Data

(63) Continuation of application No. 08/684,486, filed on Jul. 19, 1996, now Pat. No. 5,793,995.

(51) Int. Cl.[7] .................................................... G06F 13/00
(52) U.S. Cl. ............................................................. 710/129
(58) Field of Search ..................................... 710/128, 129

(56) References Cited

U.S. PATENT DOCUMENTS

| | | |
|---|---|---|
| 5,640,570 | 6/1997 | St. Clair et al. ...................... 395/233 |
| 5,642,489 | 6/1997 | Bland et al. ........................ 395/308 |
| 5,903,766 * | 5/1999 | Walker et al. ....................... 713/323 |
| 5,943,507 * | 8/1999 | Cornish et al. ........................ 710/48 |

OTHER PUBLICATIONS

DMA Support on the "PCIway", Aug. 2, 1995, Version 5.4, Preliminary, pp. 2–16.
PCI Specification, Rev. 2.1, A100910, pp. 37–72, Aug. 3, 1995.

* cited by examiner

*Primary Examiner*—David A Wiley
(74) *Attorney, Agent, or Firm*—Sharp Comfort & Merrett, P.C.

(57) ABSTRACT

The present invention relates to a system and method for shadowing data of a first register and a second register of a computer system that share a common address. When a bus agent runs a write operation to the register address, retry logic of a first bridge circuit retries the write operation and masks access by the bus agent to the bus. Retry bus master logic reruns the write operation, in response to which the second bridge circuit subtractively decodes the rerun write operation and transfers the data to the second register. The bus agent is then allowed to retry the initial write operation, in response to which the first bridge circuit positively decodes the retried write operation and transfers the data to the first register. Thus, coherency is preserved between the first and second registers.

26 Claims, 11 Drawing Sheets

BUS SYSTEM FOR SHADOWING REGISTERS

This application is a continuation of Ser. No. 08/684,486 filed Jul. 19, 1996 U.S. Pat. No. 5,793,995.

BACKGROUND OF THE INVENTION

1. Field of the Invention

The present invention relates to updating information shared between one or more bus devices in a computer system, and more particularly, to a system for shadowing registers of these devices.

2. Description of the Related Art

Personal computers are constantly evolving to provide the user with the highest performance available at the lowest cost. Performance improvements in the microprocessor and memory systems have resulted in computers so powerful that they are now capable of performing tasks that before could only be performed by large mainframe computers. Technological change is especially exemplified in the area of portable computers where power consumption efficiency is balanced against features, cost, size, weight and performance. Achieving this balance is especially challenging since many computer users demand the portable computer to provide nothing less than what a desktop unit can provide. The term "portable computers" is used broadly here to denote the class of computers powered by battery or solar power. Those familiar with portable computers will recognize labels such as portable, luggable, laptop, notebook and handheld, which are used to designate certain marketing segments of the larger portable computer market.

Many options are available to the computer system designer. While designing around the highest performance processor available will go far towards providing a high performance product, in today's competitive market that is not enough. The processor must be supported by high performance components, including a high performance expansion bus. Several standardized expansion buses are available to the system designer, including the ISA (Industry Standard Architecture) bus and the EISA (Extended Industry Standard Architecture) bus.

For the system bus, a high performance bus such as the Peripheral Component Interconnect (PCI) bus or the EISA bus is used. The three above-described buses are familiar to those skilled in the art.

Design choices also involve implementing certain special features of the computer that distinguish one manufacturer's computer from a competitor's. In the portable computer market this is especially challenging since added features can cause increased size and weight. For example, since software can require large amounts of storage, a high capacity hard disk drive is often desirable. However, such high capacity disk drives are usually larger and heavier than desirable for a portable computer. It is also desirable to have the ability to add functionality to the portable computer using expansion hardware. However, providing integral expansion bays compromises the small size.

One known method of providing additional features without sacrificing size and weight is through the use of an expansion base unit. An expansion base unit is a non-portable unit that typically operates from AC power and resides on a user's desktop. When the user is working at the desk, the portable computer plugs into the expansion base unit, which then provides the added functionality. The expansion base unit may include a network interface unit for connecting to a local area network, one or more high capacity disk drives, a floppy drive and other peripherals.

Typically, in a computer system having a laptop computer unit and an expansion base unit, information regarding floppy disk drive selects, motor selects and status bits are stored in floppy disk drive control registers. Such a computer system, however, may have two sets of these registers, one set located in a floppy drive controller of the laptop unit and one set located in a floppy drive controller of the expansion base unit. To ensure system compatibility the floppy disk drive registers of the laptop unit would typically have the same address as the corresponding registers of the expansion base unit.

Thus, these bus devices must have various registers that share common data. A problem occurs when the data in one of these registers is updated because registers sharing the same address should contain the same data.

Reflecting the contents of one register in another register is known as "shadowing." Data in a "shadowed" register is shadowed by one or more "shadowing" registers. One way to shadow a register is to perform bus write operations to every shadowing register when the shadowed register is updated with new data. However, as noted above, both the shadowed and the shadowing floppy disk drive registers should share a common address. The data is transferred to each set of floppy drive registers through an associated bridge circuit. Therefore, a problem arises in writing to both sets of floppy drive registers as the bridge circuits may not concurrently be able to transfer the data to the registers.

SUMMARY OF THE INVENTION

Briefly, the present invention relates to a system for shadowing write operations to a first register of a first bus device in a second register of a second bus device. Both the first and second registers share a common address and are accessible through a system bus. A first bridge circuit coupled to the system bus controls write operations to the first register, and a second bridge circuit coupled to the system bus controls write operations to the second register.

The first bridge circuit includes positive decode logic to detect a first write operation to the first register from a bus agent of the system bus. Upon positively decoding such a write, the retry logic interacts with first slave logic to furnish a known retry sequence on the system bus. This aborts the first write operation which must then be retried. An arbiter of the first bridge circuit masks a system bus request from the bus agent which attempts to retry the first write operation.

A retry bus master of the first bridge circuit then performs a second write operation over the system bus to the common address using the same data and address of the first write operation. This allows second slave logic of the second bridge circuit to subtractively decode and accept the write operation. When this occurs, the second bridge circuit transfers the data to the second register.

After the second write operation, the retry logic interacts with the arbiter to unmask the system bus request from the bus agent. This allows the arbiter to grant the system bus to the bus agent. The bus agent can then retry the first write operation. This allows the first slave logic to positively decode and accept the retried first write operation. Upon this occurrence, the first bridge circuit transfers the data to the first register. Thus, updates in the register data are reflected, or shadowed, to all registers sharing the common address.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. Application Ser. No. 08/684,412, entitled "CIRCUIT FOR HANDLING DISTRIBUTED ARBITRATION IN A COMPUTER SYSTEM HAVING MULTIPLE ARBITERS," by Dwight D. Riley, James R. Edwards and David J. Maguire, filed concurrently herewith;

U.S. Application Ser. No.: 08/684,485, entitled "LONG LATENCY INTERRUPT HANDLING AND INPUT/OUTPUT WHILE POSTING," now U.S. Pat. No. 5,748,911 by David J. Maguire and James R. Edwards, filed concurrently herewith;

U.S. Application Ser. No. 08/684,710, entitled "SERIAL BUS SYSTEM FOR SHADOWING REGISTERS," by David J. Maguire and Hung Q. Le, filed concurrently herewith;

U.S. Application Ser. No. 08/684,584, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. Application Ser. No. 08/671,316, entitled "TWO ISA BUS CONCEPT," by Gregory N. Santos, James R. Edwards, Dwight D. Riley and David J. Maguire, filed concurrently herewith;

U.S. Application Ser. No. 08/684,490, entitled "RECONFIGURABLE DUAL MASTER IDE INTERFACE," by Gregory N. Santos, David J. Maguire, William C. Hallowell and James R. Edwards, filed concurrently herewith; and U.S. Application Ser. No. 08/684,255, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle, filed concurrently herewith; all of which are assigned to the assignee of this invention.

1. Overview of the Computer System

Figure 1:
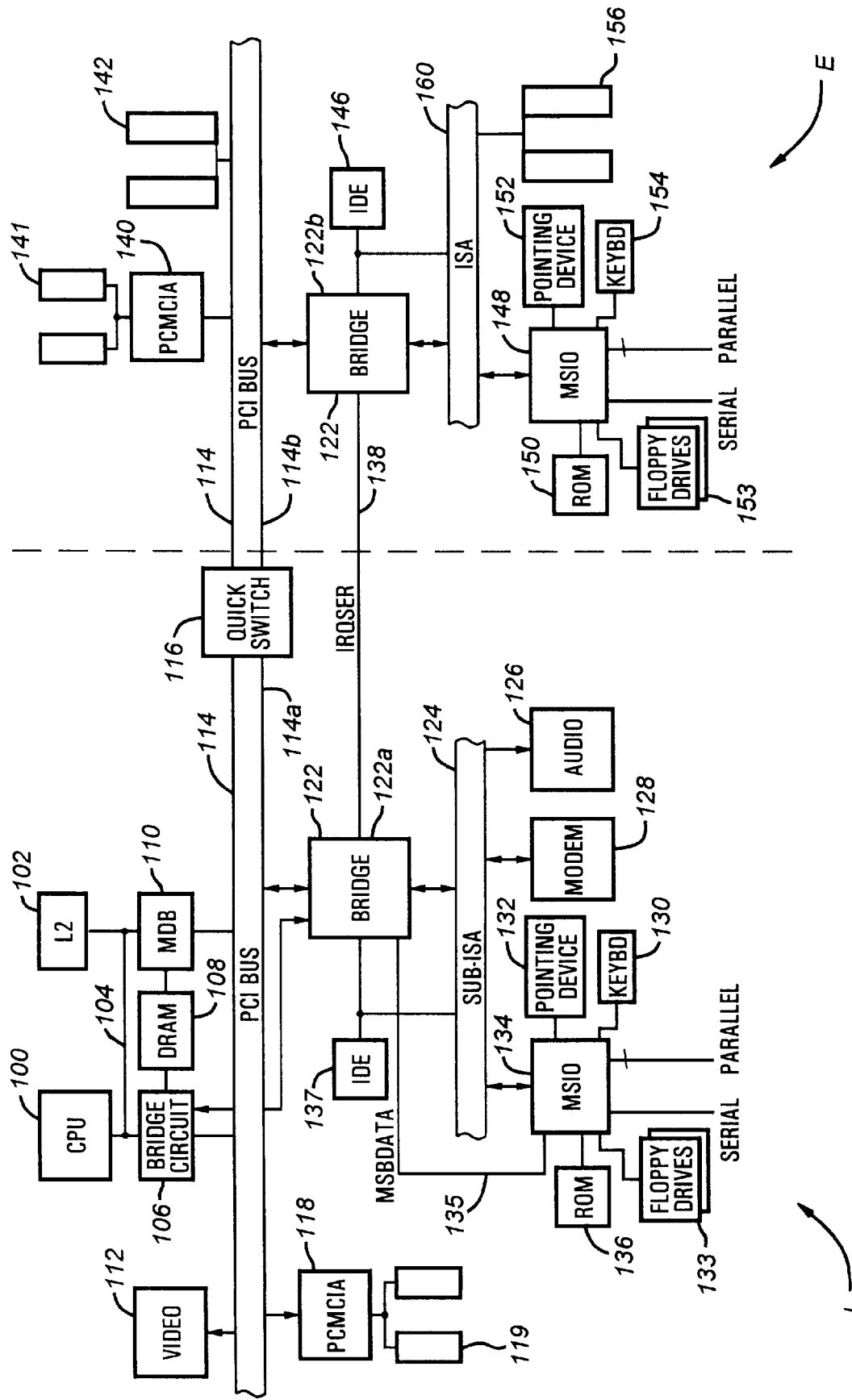
FIG. 1 is a block diagram illustrating a computer system incorporating the present invention.

Shown in FIG. 1 is a computer system having a laptop computer unit L and an expansion base unit E. The laptop computer unit L includes a central processing unit (CPU) 100 coupled to a local processor bus 104. Also coupled to the local processor bus 104 is a level two (L2) cache 102.

Interfacing the local processor bus 104 to a Peripheral Component Interconnect (PCI) bus 114 is a local processor bus-to-PCI bus interface bridge circuit 106. The PCI bus 114 includes a segment 114a in the laptop unit L and a segment 114b in the expansion base unit E. The bridge circuit 106 also functions as a system memory controller and has control and data lines coupled to a dynamic random access memory (DRAM) 108. The data lines of the memory 108 are coupled to data buffers 110. The data buffers are also coupled to the local processor bus 104 and the PCI bus 114.

The laptop computer unit L further includes a video board 112 and a Personal Computer Memory Card International Association (PCMCIA) controller 118 which are coupled to the PCI bus 114. The PCMCIA controller 118 is coupled to two PCMCIA slots 119. The laptop computer unit L includes several metal-oxide-semiconductor field-effect-transistor (MOSFET) switches represented by a Quick Switch circuit 116 for coupling and decoupling the PCI bus 114 to external PCI bus connectors (not shown).

When the laptop computer unit L senses the expansion base unit E is being hot docked into the laptop computer unit L, the laptop computer unit L performs docking operations such as idling the PCI bus 114. The laptop computer unit L then enables the Quick Switch circuit 116, which couples the PCI bus 114a to the external PCI bus connectors. This couples the PCI bus segment 114a to the PCI bus segment 114b, creating the PCI bus 114 shared by both the laptop computer unit L and the expansion base unit E.

When the laptop computer unit L senses the expansion base unit E is being undocked, the laptop computer unit L performs undocking operations such as idling the PCI bus 114. Upon this occurrence, the laptop unit L disables the Quick Switch 116. This isolates the PCI bus 114a from the external bus connectors.

The expansion base unit E further includes a PCMCIA controller 140 and two PCI card slots 142, both of which are coupled to the PCI bus 114. The PCMCIA controller 140 is coupled to two PCMCIA slots 141. Both the laptop computer unit L and the expansion base unit E include bridge circuits, bridge circuit 122a and bridge circuit 122a, respectively, of common design 122, which operate in two different modes.

References to elements and signals of the bridge circuit 122a are indicated by the suffix "a," and references to elements and signals of the bridge circuit 122b are indicated by the suffix "b." Furthermore, in this specification, the suffix "_" denotes negative logic. The assertion of a signal with the "_" suffix means the signal is pulled "low." The deassertion of the signal with the "_" suffix equates to the signal being "high."

When the expansion base unit E is docked to the laptop computer unit L, the bridge circuit 122a operates in a laptop mode and the bridge circuit 122b operates in an expansion base mode, the relevant differences of which for this invention are described below.

The laptop computer unit L includes a sub-Industry Standard Architecture sub-(ISA) bus 124, a subset of the ISA bus, which is interfaced to the PCI bus 114 by the bridge circuit 122a. Similarly, the bridge circuit 122b interfaces the PCI bus 114 to a complete ISA bus 160. Both the sub-ISA bus 124 and the ISA bus 160 are expansion buses.

The sub-ISA bus 124 does not have interrupt request lines as a standard ISA bus. Instead the devices coupled to the sub-ISA bus 124 each furnish an interrupt request line to the bridge circuit 122a which can map the interrupt request signals associated with these lines to a standard set of ISA/EISA IRQ signals.

According to the PCI standard, one device on a PCI bus must subtractively decode operations on the PCI bus when no other device positively decodes that operation. These subtractively decoded operations are typically passed to the expansion bus. In FIG. 1, the bridge circuit 122a, operating in the laptop mode, subtractively decodes PCI bus cycles from the PCI bus 114 when the laptop L is not docked to the expansion base unit E. When the laptop computer unit L is docked to the expansion base unit E, the bridge circuit 122a instead acts as a positive decode device. The bridge circuit 122b, operating in the expansion base mode, always subtractively decodes the PCI bus signals.

To arbitrate between the bridge circuits 122a and 122b for the shared PCI system bus 114, a top-level arbiter in the bridge circuit 122a arbitrates between a first lower arbiter 208a (FIG. 2) in the bridge circuit 122a and a second lower arbiter 208b (FIG. 2) in the bridge circuit 122b. The arbiters 208a and 208b arbitrate control of the PCI bus 114 on a time share basis utilizing a least recently used (LRU) prioritization scheme. The bridge circuit 122a and the bridge circuit 122b combine system interrupt information through a serial interrupt bus 138 coupled to the two bridge circuits 122a and 122b, among others.

Both of these arbiters 208 are idle when the laptop computer unit L is being hot docked or undocked to or from the expansion base unit E. The term "hot docked" means the laptop computer unit L is plugged, or inserted, into the expansion base unit E while both units remain turned on. This system of arbitration is further described in the previously incorporated U.S. patent application entitled "CIRCUIT FOR HANDLING DISTRIBUTED ARBITRATION IN A COMPUTER SYSTEM HAVING MULTIPLE ARBITERS".

The laptop computer unit L further includes a modem 128 coupled to the sub-ISA bus 124, an audio system 126 coupled to the sub-ISA bus 124, and an Intelligent Device Electronics (IDE) interface 137 coupled both to the sub-ISA bus 124 and the bridge circuit 122a. The bridge circuit 122a is also coupled to the bridge circuit 106 for monitoring and controlling the idle status of the bridge circuit 106.

Coupled to the sub-ISA bus 124 is a Mobile Super Input/Output (MSIO) device 134 which has an attached read only memory (ROM) 136, a pointing device 132, floppy drives 133, and a keyboard 130. The MSIO 134 also has a serial and a parallel port. Both the MSIO 134 and the bridge circuit 122a communicate information relating to power management and hot docking over a MSBDATA serial bus 135. This bus is further described in the previously incorporated U.S. patent application entitled "SERIAL BUS SYSTEM FOR SHADOWING REGISTERS".

The expansion base unit E further includes a MSIO unit 148 coupled to the ISA bus 160 of similar design to the MSIO 134. Two ISA slots 156 are coupled to the ISA bus 160, and an IDE interface 146 is coupled to both the bridge circuit 122b and the ISA bus 160. Also coupled to the MSIO 148 are floppy drives 153, a ROM 150, a pointing device 152 and a keyboard 154. Similar to the MSIO 134, the MSIO 148 has serial and parallel ports. The MSIO 148 also has an MSBDATA path to the bridge circuit 122b.

The MSIO 134 and the MSIO 148 each include a set of floppy drive registers which share common addresses and data. These floppy drive registers include such information as floppy drive selects, motor selects and status bits. In order to ensure coherency in the computer system, the data written to one floppy drive register in one set of floppy drive registers must be reflected in its associated floppy drive register in the other set of floppy drive registers that shares the common address.

The present invention relates to using the PCI bus 114 to shadow the floppy drive registers by employing a shadowing cycle, further described below. A shadowing cycle begins when a PCI bus agent, such as the combination of the CPU 100 and the bridge circuit 106, performs a first write operation to one of the floppy drive registers. The bridge circuit 122a subtractively decodes the first write operation. Upon this occurrence, the bridge circuit 122a indicates to the bus agent that the bus agent must retry the first write operation. The bridge circuit 122a does so by furnishing a standard, known PCI retry sequence on the PCI bus 114. Additionally, the bridge circuit 122a temporarily inhibits the bus agent from controlling the PCI bus 114 by masking the bus access request of the bus agent from the arbiter 208a. This is further explained below beginning with the discussion of FIG. 2. Thus, the initiating bus agent cannot immediately retry the first write operation.

The bridge circuit 122a then performs a second write to the PCI bus 114 with the same data and at the same address as the first write operation. The bridge circuit 122a, however, does not positively decode the second write operation, thus allowing the bridge circuit 122b to subtractively decode the second write operation. The bridge circuit 122b then performs a write on the ISA bus 160 to transfer the data to the addressed floppy drive register inside the MSIO 148. At this point, the addressed floppy drive registers in the MSIO 148 contain shadowed data, or identical data, to that of the MSIO 134.

After a successful second write operation, the bridge circuit 122a allows the bus agent to retry the first write operation by unmasking the request of the bus agent from the arbiter 208a. The bridge circuit 122a then positively decodes and accepts the retried first write operation and perform a write on the sub-ISA bus 124 to transfer the data to the addressed floppy drive register inside the MSIO 134.

Thus, floppy drive registers sharing the same address are both updated to ensure coherency. For read operations from a floppy drive register, the bridge circuit 122a positively decodes and accepts the read operation. The bridge circuit 122a then transfers the data from the corresponding floppy drive register in the MSIO 134 to the PCI bus 114.

To summarize, the bridge circuits 122a and 122b both transfer data from the PCI bus 114 to their respective floppy drive registers. When the bridge circuit 122a positively decodes a floppy drive register access, the bridge circuit 122a forces the initiating agent to retry that write. The bridge circuit 122a, however, inhibits that retry until the bridge circuit 122a successfully writes the same data to the sub-ISA expansion bus 124.

The second write operation has the same data and address of the first write operation. Once the bridge circuit 122a drives the second write operation the bridge circuit 122b subtractively decodes and accepts the second write operation. The bridge circuit 122a then allows the first write operation to be retried. The bridge circuit 122a then positively decodes and accepts the retried first write operation.

2. Overview of the Shadowing Cycle and System

Figure 2:
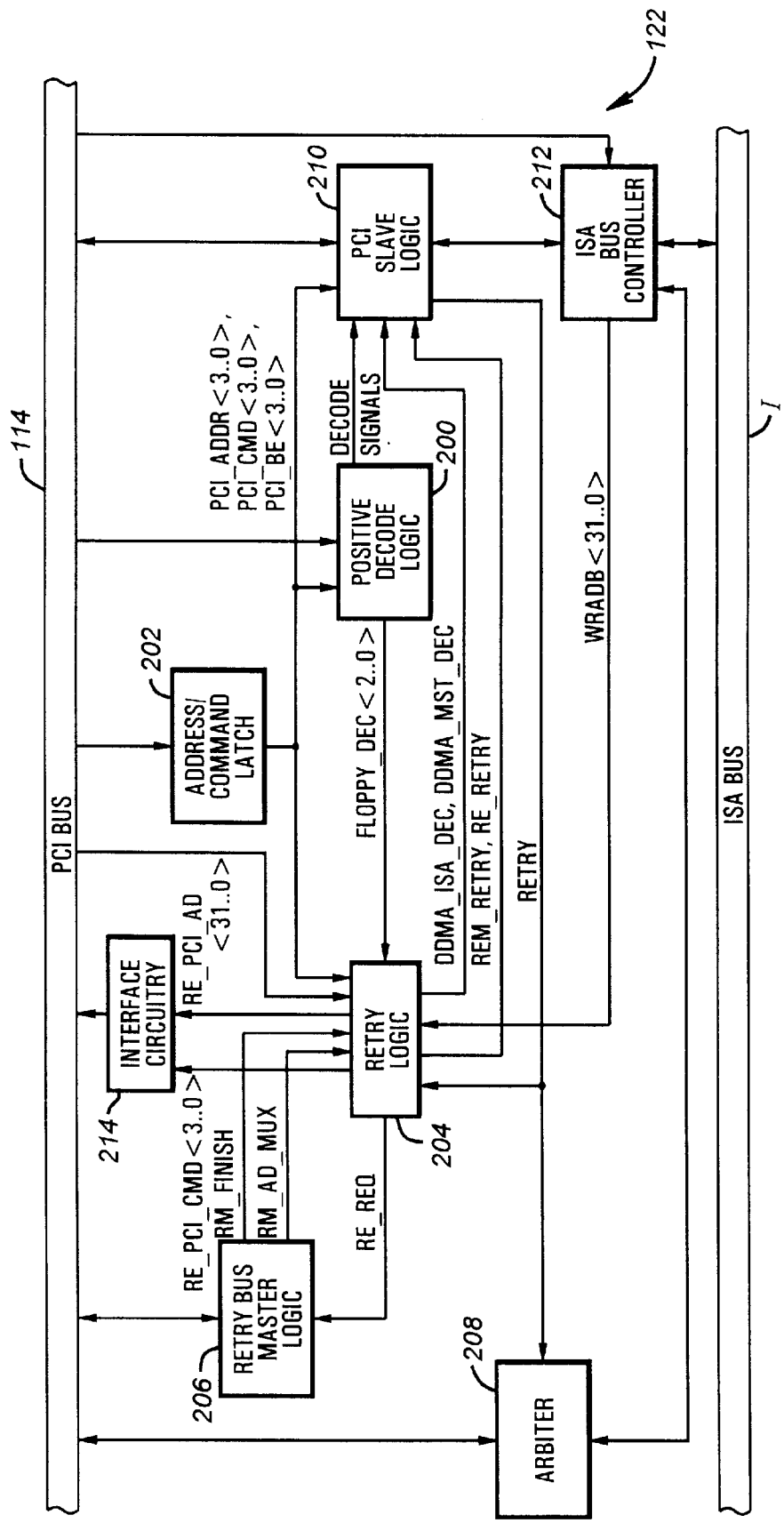
FIG. 2 is a block diagram illustrating the design and operation of the bridge circuit according to the invention.

Shown in FIG. 2 is a block diagram illustrating the design and operation of portions of the bridge circuit 122 which is an application specific integrated circuit (ASIC). The ISA bus I represents either the sub-ISA bus 124 or the ISA bus 160.

An address\command latch 202 is coupled to the PCI bus 114. When an operation is initiated on the PCI bus 114, the latch 202 provides current latched PCI address, command and byte enable signals represented by PCI_ADDR<31..0>, PCI_CMD<3..0> and PCI_BE<3..0>, respectively. These signals are provided to positive decode logic 200, which furnishes signals indicative of when the floppy drive registers have been positively decoded.

As previously described, no shadowing occurs for read operations from the floppy drive registers. On such a read, PCI slave logic 210a, coupled to the PCI bus 114, accepts the read operation on the PCI bus 114. If the laptop unit L is docked to the expansion base unit E, the PCI slave logic 210a positively decodes the read operation. Otherwise, the PCI slave logic 210a subtractively decodes the read operation.

An ISA bus controller 212a reads the requested information from the MSIO 134 and presents the data, represented by WRADB<31..0>a, to a retry logic circuit 204a. The ISA bus controller 212a is coupled to the PCI slave logic 210a, the ISA bus I, the PCI bus 114 and the arbiter 208a. The retry logic circuit 204a has data lines, represented by RE_PCI_AD<31..0>a, coupled to the PCI bus 114 through conventional interface circuitry 214a. The remaining signals are discussed below in conjunction with FIG. 3.

Figure 3:
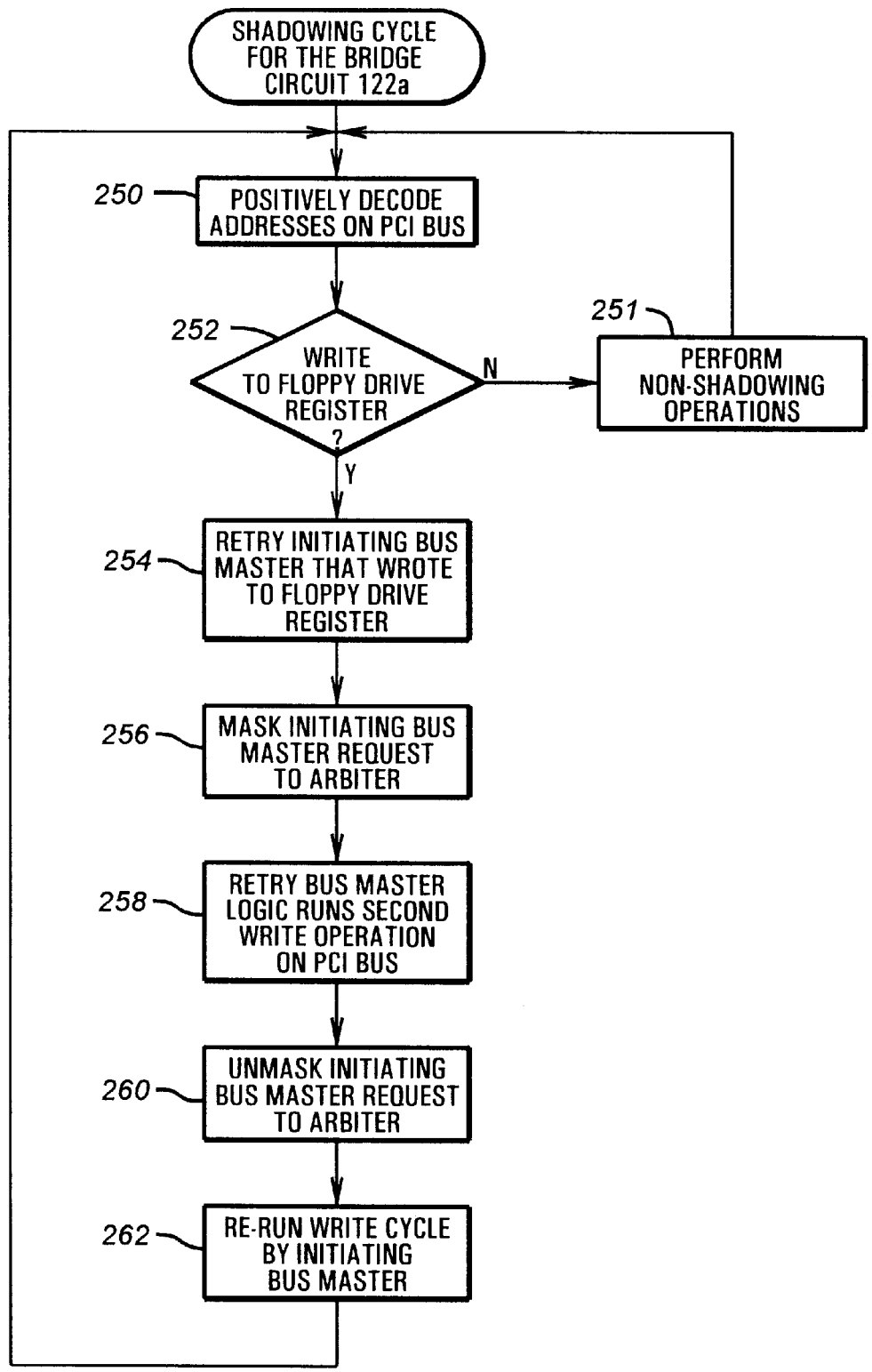
FIG. 3 is a flowchart diagram illustrating a shadowing cycle according to the invention.

FIG. 3 is a flowchart diagram illustrating the steps performed by the bridge circuit 122a after the bus agent performs the first write operation to one of the floppy drive registers, beginning the shadowing cycle. In step 250 the positive decode logic 200a positively decodes the address present on the PCI bus 114 during the first write operation. The positive decode logic 200a furnishes floppy drive decode signals FLOPPY_DEC<2..0>a to the retry logic 204a. The floppy drive decode signals FLOPPY_DEC<2..0>a indicate when one of the floppy drive register addresses appears during an address phase of the PCI bus 114.

Control then transfers from step 250 to step 252, where the retry logic 204a determines whether the access on the PCI bus 114 was a write operation to a floppy drive register. If not a write operation to a floppy drive register, then control transfers from step 252 to step 251 where other non-shadowing operations are performed. Control transitions from step 251 back to step 250. If in step 252 the retry logic 204a determines that a write to a floppy drive register has occurred, i.e., the first write of a shadow cycle, then control transfers to step 254.

The retry logic 204a furnishes a retry bus master logic retry signal REM_RETRY and a retry engine retry signal RE_RETRY to the PCI slave logic 210a. When asserted, the REM_RETRY signal indicates that the retry bus master logic 206a is currently driving the second write of a shadowing cycle on the PCI bus 114. The REM_RETRY signal is otherwise negated.

The retry bus master logic 206a asserts the RE_RETRY signal when it is driving the second write operation on the PCI bus 114 and this implies the retry logic 204a is awaiting the retried first write operation from the bus agent. The RE_RETRY signal is otherwise negated.

In step 254, the retry logic 204a asserts the REM_RETRY signal in response to which the PCI slave logic 210a furnishes the known PCI retry sequence to the PCI bus 114. This retry sequence indicates to the initiating agent that the bridge circuit 122a has aborted the first write operation.

Control then transitions from step 254 to step 256, where the PCI slave logic 210a asserts a retry signal RETRY, which is provided to the arbiter 208a. The arbiter 208a is coupled to the PCI bus 114 and the ISA bus controller 212a. The asserted RETRY signal indicates to the arbiter 208a to mask the current PCI bus 114 request from the initiating bus agent should assert in response to the retry of step 254. This masking avoids bus thrashing problems by preventing the bus master from retrying the first write operation until the second write operation is completed. When the RETRY signal is subsequently negated, the retried first write operation has the highest arbitration priority.

A more detailed description of the arbiter 208 and the masking of PCI bus 114 requests through the use of the RETRY signal is disclosed in U.S. patent application Ser. No. 08/398,436, entitled, "Circuit for Improving Computer System Bus Performance" filed Mar. 3, 1995, commonly assigned, which is hereby incorporated by reference.

Once the known PCI retry sequence is presented to retry the first write operation and the request for control of the PCI bus 114 by the bus agent is masked, the retry logic 204a asserts a retry engine request signal RE_REQ. The RE_REQ signal is provided to the retry bus master logic 206a. The assertion of the RE_REQ signal by the retry logic 204a begins the second write operation on the PCI bus 114, which is controlled by the retry bus master logic 206a.

Control then transitions from step 256 to step 258. In step 258, the retry logic 204a supplies the address signals indicated RE_PCI_AD<31..0> and the command signals indicated by RE_PCI_CBE<3..0> to the PCI bus 114 through the interface circuitry 214 during the address phase of the PCI bus 114. When the retry bus master logic 206 completes the address phase of the second write operation and transitions to the data phase, the retry bus master logic 206a indicates this by negating a RM_AD_MUX signal, which is an address and data multiplexor signal used to indicate the current phase on the PCI bus 114. The RM_AD_MIX signal is negated during the data phase and asserted during the address phase. When the RM_AD_MUX signal is negated, the retry logic 204a furnishes the data from the first write operation represented by RE_PCI_AD<31..0> and the byte enables from the first write operation represented by RE_PCI_CBE<3..0> to the interface circuitry 214. The retry bus master logic 206a asserts a bus master finish signal RM_FINISH to indicate completion of the second write operation on the PCI bus 114. The RM_FINISH signal is otherwise low, or negated. Completion of the second write operation indicates the bridge circuit 122b has subtractively decoded and accepted the second write operation.

Control transitions from step 258 to step 260, where the retry logic 204a drives the retry signal REM_RETRY low, or false, allowing the arbiter 208a to grant the request of the bus agent to retry the first write operation Control then transfers to step 262 where the bus agent performs the retried first write operation. Completion of the retried first write operation occurs when the PCI slave logic 210a positively decodes and accepts the first retried bus write operation. The ISA bus controller 212a then writes the data to the floppy drive registers in the MSIO 134 through the sub-ISA bus 124.

The retry logic 204a furnishes two additional signals to the PCI slave logic 210a to inform the PCI slave logic 210a of the identity of the PCI bus master driving the current cycle on the PCI bus 114. The retry logic 204a furnishes a DDMA_ISA_DECa signal, which indicates that the bus agent is retrying the first write operation when asserted. The DDMA_ISA_DECa signal is otherwise low.

The retry logic 204a also provides a DDMA_MST_DECa signal, which indicates, when asserted, that a write operation to one of the floppy drive register addresses has been detected and that the write operation is not driven by the retry bus master logic 206a. Thus, the retry logic 204 asserts the DDMA_MST_DEC a signal during the second and retried first write operations The DDMA_MST_DEC signal is otherwise low.

In summary, for a read operation to a floppy drive register address, the PCI slave logic 210a positively decodes and furnishes the read data to the PCI bus 114. For write operations, the bridge circuit 122a initiates the shadowing cycle.

To initiate the shadowing cycle, the PCI slave logic 210a furnishes the known retry sequence to the PCI bus 114 when the positive decode logic 200a and the retry logic 204a indicate the first write operation. The retry bus master logic 206 drives the second write operation, which is subtractively decoded by the bridge circuit 122b.

The retry logic 204a initiates the generation of the second write operation by the retry bus master logic 206a and interacts with the PCI slave logic 210a and the arbiter 208a to mask the bus request from the bus agent until after the second write operation.

After the bus request is unmasked, the bus agent is then granted control of the PCI bus 114. The bus agent can then retry the first write operation, which is positively decoded and accepted by the bridge circuit 122a.

3. The Bridge Circuit a. The Positive Decode Logic

Figure 4:
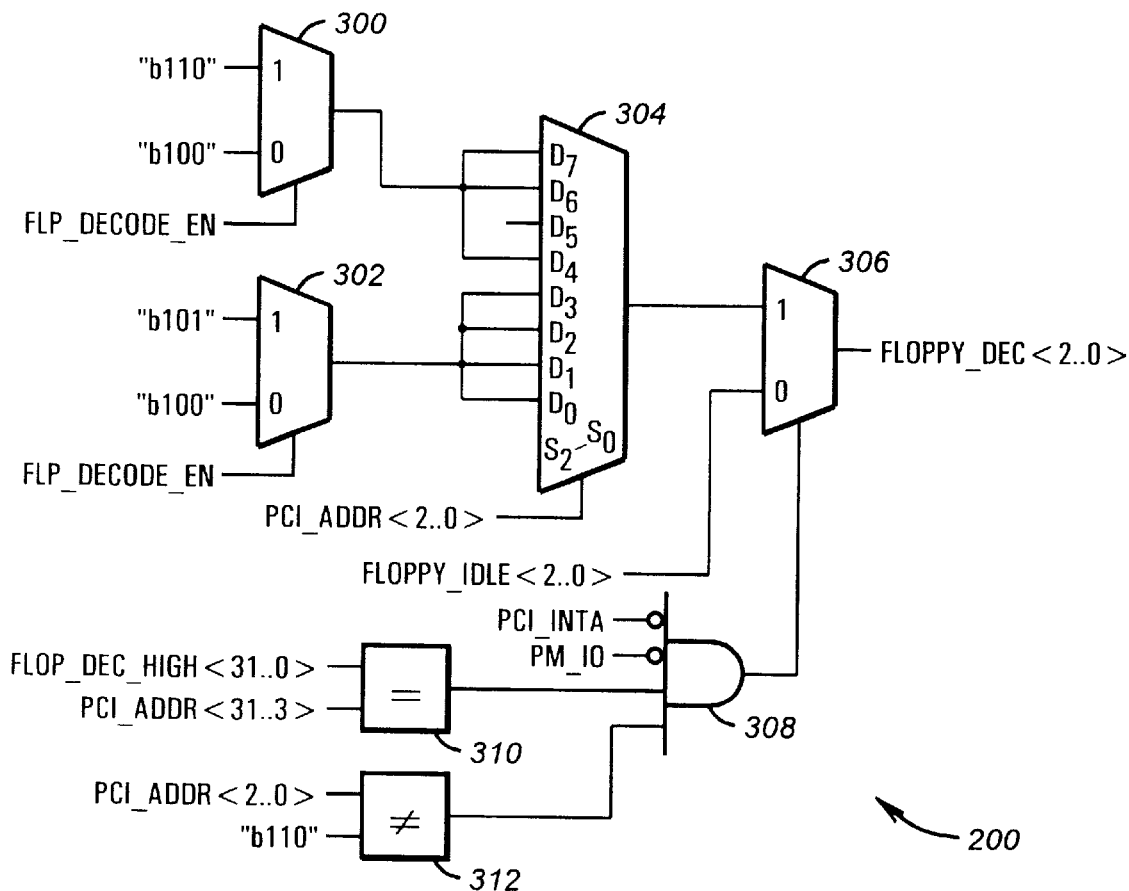
FIG. 4 is a schematic diagram illustrating the design and operation of the positive decode logic of the bridge circuit according to the invention.

FIG. 4 is a schematic diagram illustrating the design and operation of the positive decode logic 200. As described above, the bridge circuit 122b is a subtractive decode agent on the PCI bus 114; therefore, the positive decode logic 200b is disabled on the bridge circuit 122b and enabled on the bridge circuit 122a.

The enabling and disabling of the positive decode logic 200b is accomplished through a FLP_DECODE_EN signal, which when asserted indicates a laptop mode of operation and when negated, indicates an expansion base mode of operation. The FLP_DECODE_EN signal is provided by an associated configuration bit present in a configuration register of the bridge circuit 122.

As explained further below, when an address of one of the floppy drive registers is detected on the PCI bus 114, the FLOPPY_DEC<2..0> signals are either equal to "b101" or "b110," where the prefix "b" denotes binary representation. If the two least significant bits of the FLOPPY_DEC<2..0> signals are equal to "b00," then either the bridge circuit 122 is in the expansion base unit mode (bridge circuit 122b) or no floppy drive register address has been detected on the PCI bus 114.

The positive decode logic 200 includes a multiplexor 300 with its select input receiving the FLP_DECODE_EN signal. Signals representative of "b100" are provided to three zero inputs of the multiplexor 300, and signals representative of "b110" are provided to three one inputs of the multiplexor 300.

The select input of a multiplexor 302 receives the FLP_DECODE_EN signal. The zero inputs of the multiplexor 302 receive three signals representative of "b100," and three one inputs of the multiplexor 302 receive three signals representative of "b101."

The outputs of the multiplexor 302 are all provided to the zero through third inputs of a multiplexor 304. Each input of the multiplexor 304 receives a three bit signal. The fourth, sixth and seventh inputs of the multiplexor 304 receive the outputs of the multiplexor 300. The zero through second select inputs of the multiplexor 304 receive the three least significant PCI address lines PCI_ADDR<2..0> furnished by the latch 202.

The floppy drive registers include seven registers. Only four of these registers are writeable, as further described below. As further explained below, when a lower floppy drive register address range is detected on the PCI bus 114, the three bit signal representative of "b101" is provided at the output of the multiplexor 304. When the higher floppy drive register address range is detected, the three bit signal representative of "b110" is provided at the output of the multiplexor 304. If no floppy drive register addresses are detected on the PCI bus 114, then the three bit binary signal representative of "b100" is provided at the output of the multiplexor 304.

A multiplexor 306 ensures that the correct addresses are monitored on the PCI bus 114. Each input of the multiplexor 306 receives a three bit signal. The output of the multiplexer 306 furnishes the FLOPPY_DEC<2..0> signals. The first input of the multiplexor 306 receives the output of the multiplexor 304 and the zero input of the multiplexor 306 receives FLOPPY_IDLE<2..0> signals equal to "b000" which that indicates no floppy drive register addresses have been detected. Thus, the FLOPPY_DEC<2> signal, when true, indicates that floppy drive register addresses have been detected on the current operation of the PCI bus 114.

The select input of the multiplexor 306 is furnished by the output of an AND gate 308. One input of the AND 308 receives an inverted PCI_INTA signal. When asserted, the PCI_INTA signal indicates an interrupt acknowledgement sequence is occurring on the PCI bus 114. The PCI_INTA signal is otherwise low.

The AND gate 308 further receives as an input an inverted PM_IO signal. When asserted the PM_IO signal indicates a memory cycle is occurring on the PCI bus 114, and when low the PM_IO signal indicates an I/O cycle is occurring on the PCI bus 114.

The AND gate 308 further receives the output of an equal circuit 310, which receives as one of its inputs a twenty-nine bit parameter indicative of the high address range of the floppy drive registers, FLOP_DEC_HIGH<31..3>. That input is compared to the other input, the twenty-nine most significant PCI address lines PCI_ADDR<31..3>. Thus, when the twenty-nine most significant address lines present on the PCI bus 114 are indicative of the floppy drive registers addresses, the output of the equal circuit 310 is true.

The AND gate 308 further receives the output of a not equal circuit 312, which receives as inputs a three bit binary signal representative of "b110" and the three least significant address lines of the PCI bus 114, represented by PCI_ADDR<2..0>. The not equal circuit 312 asserts its output when these two inputs are not equal. In the described embodiment, when these three lines PCI_ADDR<2..0> equal "b110," this indicates an access to a non-existent floppy drive register address.

In summary, when an I/O cycle is present on the PCI bus 114, and that I/O cycle is not an interrupt acknowledgement sequence, the multiplexor 304 outputs the floppy decode signals FLOPPY_DEC<2..0>. The FLOPPY_DEC<2..0> signals reflect a floppy register access when the FLOPPY_DEC<2> signal is high. In that case, one of the two least significant FLOPPY_DEC<2..0> signals is asserted. If no access to the floppy drive register addresses is detected (i.e., FLOPPY_DEC<2> is low), then the two least significant FLOPPY DEC signals are also low.

b. The Retry Logic

Figure 5:
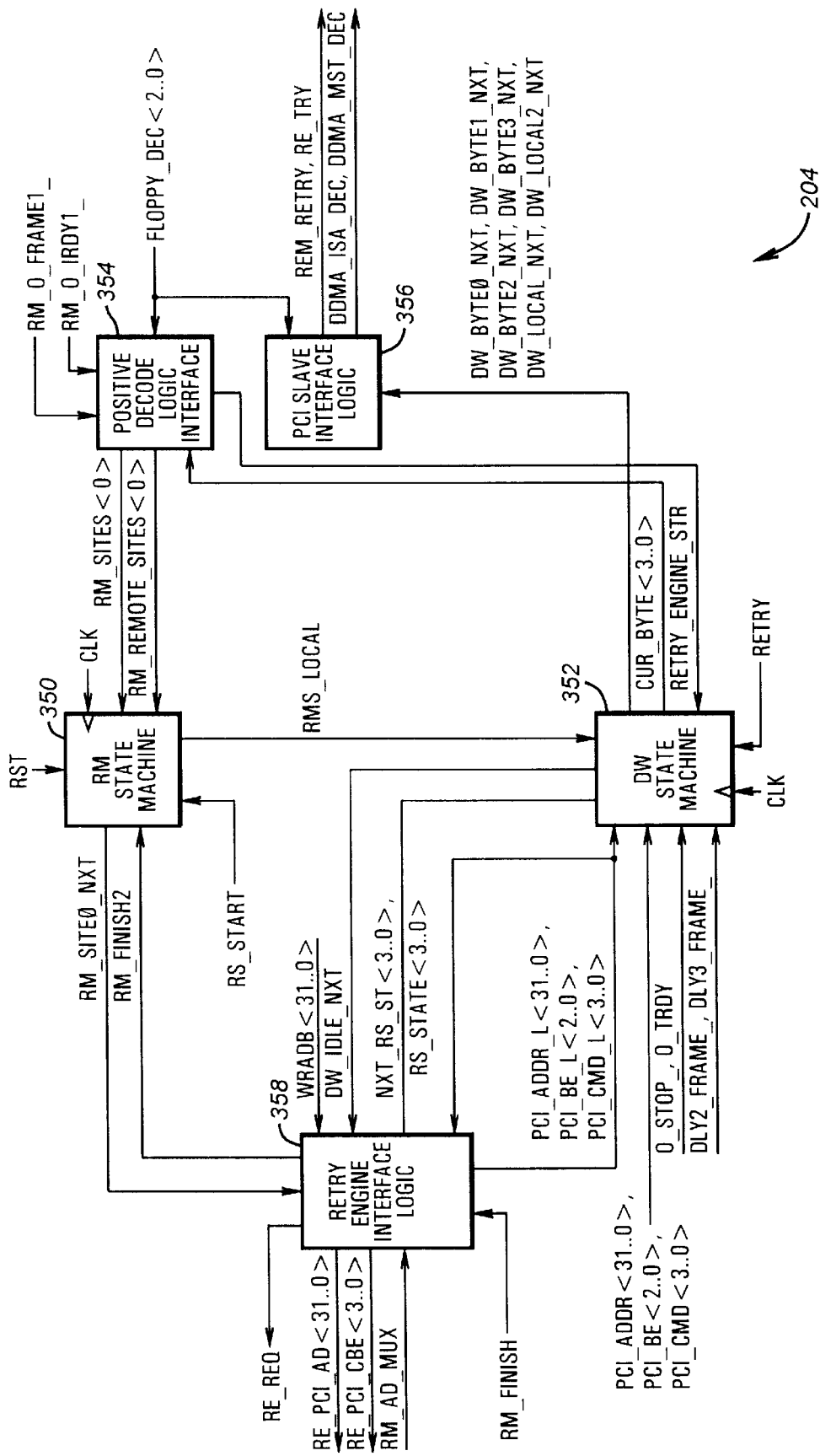
FIG. 5 is a block diagram illustrating the design and operation of the retry logic of the bridge circuit according to the invention.

FIG. 5 is a schematic diagram illustrating design and operation of the retry logic 204. A positive decode logic interface 354 receives the floppy drive decode signals FLOPPY_DEC<2..0> and interface signals from the retry bus master logic 206. From this information, the positive decode logic interface 354 furnishes a retry engine start signal RETRY_ENGINE_STR, which when asserted indicates the beginning of the second write operation. The RETRY_ENGINE_STR signal is otherwise low.

The positive decode logic interface 354 further receives current byte signals CUR_BYTE<3..0>. The CUR_BYTE<3..0> signals indicate which byte of data is being transferred during the second write operation, as further explained below. From this information and the information provided by the floppy decode signals FLOPPY_DEC<2..0>, the positive decode logic interface 354 furnishes a RM_SITES<0> signal. When the RM_SITES<0> signal is low, this indicates that a write operation to a writeable floppy drive register address has been detected on the PCI bus 114. The RM_SITES<0> signal is otherwise high. A RM_REMOTE_SITES<0> signal, the inverse of the RM_SITES<0> signal, is also furnished by the positive decode logic interface 354.

A retry state machine 350 interacts with a double word state machine 352 to track the second write operation driven by the retry bus master logic 206a. The retry state machine 350 is clocked by the positive edge of a PCI clock signal CLK. The retry state machine 350 receives a signal RS_START, which when asserted indicates a byte of data for a floppy drive register is present on the PCI bus 114 during the second write operation. The RS_START signal is otherwise low.

For write or read operations to or from the floppy drive registers, the associated floppy drive register addresses are addressed on doubleword boundaries. One doubleword address identifies a high base address of a high address range of four, one byte floppy drive registers, and one doubleword address identifies a low base address of a low address range of four, one byte floppy drive registers. Any address in the floppy drive register address range that is in the lower address range is associated with the low base address. Similarly any address in the floppy drive register address range is in the high range of floppy drive register addresses is associated with the high base address.

The indexing of the particular floppy drive register location is accomplished during one of four data phases of the read or write operation. In each data phase, a thirty-two bit doubleword is present on the PCI bus 114. Each data phase corresponds to a particular floppy register address which is indexed from either the low base address or the high base address. This indexing is accomplished through the byte enable signals on the PCI bus 114.

For example, to transfer a byte of data to the floppy drive register located at one of the base addresses, this byte is the least significant byte of the doubleword present during the first data phase. As another example, to transfer a byte of data to one of the base addresses plus one, this data is the second least significant byte of the doubleword present during the second data phase.

The retry state machine 350 further receives a retry engine finish signal RM_FINISH2, which when asserted indicates that the retry bus master logic 206 has completed the second write operation on the PCI bus 114. The RM_FINISH2 signal is otherwise low.

The retry state machine 350 further furnishes a RMS_LOCAL signal, which indicates the completion of a local access for the bridge circuit 122a from the sub-ISA bus 124 when one of the floppy register addresses has been detected by the positive decode logic 200a. The assertion of the RMS_LOCAL signal indicates either the completion of the second write operation or an attempted write operation to a read only floppy drive register.

Also shown in FIG. 5 is the double word state machine 352, which is clocked by the positive edge of the PCI CLK signal. After the aborted first write operation, the double word state machine 352 uses the latched address, command and byte enable signals from that operation to track the current byte of data being transferred during the second write operation, represented by CUR_BYTE<3..0>. The state machine 352 also monitors the PCI bus 114 for the retried first write operation by comparing the current latched PCI command, address and byte enable signals with the PCI command, address and byte enable signals latched from the first write operation which are furnished by the retry engine interface logic 358 further discussed in conjunction with FIG. 11.

Also shown in FIG. 5 is PCI slave interface logic 356 which generates the previously discussed retry signals used to control the generation of the RETRY signal and the known retry sequence by the PCI slave logic 210. The PCI slave interface logic 356 receives signals from the double word state machine 352 indicative of the states of the second write operation, as further described below.

In summary, the retry logic 204 includes the retry state machine 350, which interacts with the double word state machine 352 to track the second write operation. The positive decode logic interface 354 receives the FLOPPY_DEC<2..0> signals and interacts with the double word state machine 352 to aid in tracking the second write operation on the PCI bus 114. The double word state machine 352 also monitors the PCI bus 114 for the retried first write operation. The retry engine interface logic 358 initiates the second write operation by asserting the RE_REQ signal. Finally, the PCI slave interface logic 356 controls the generation of the known retry sequence by the PCI slave logic 210 which is used to abort the first write operation.

i. State Diagram of the Double Word State Machine

Figure 6:
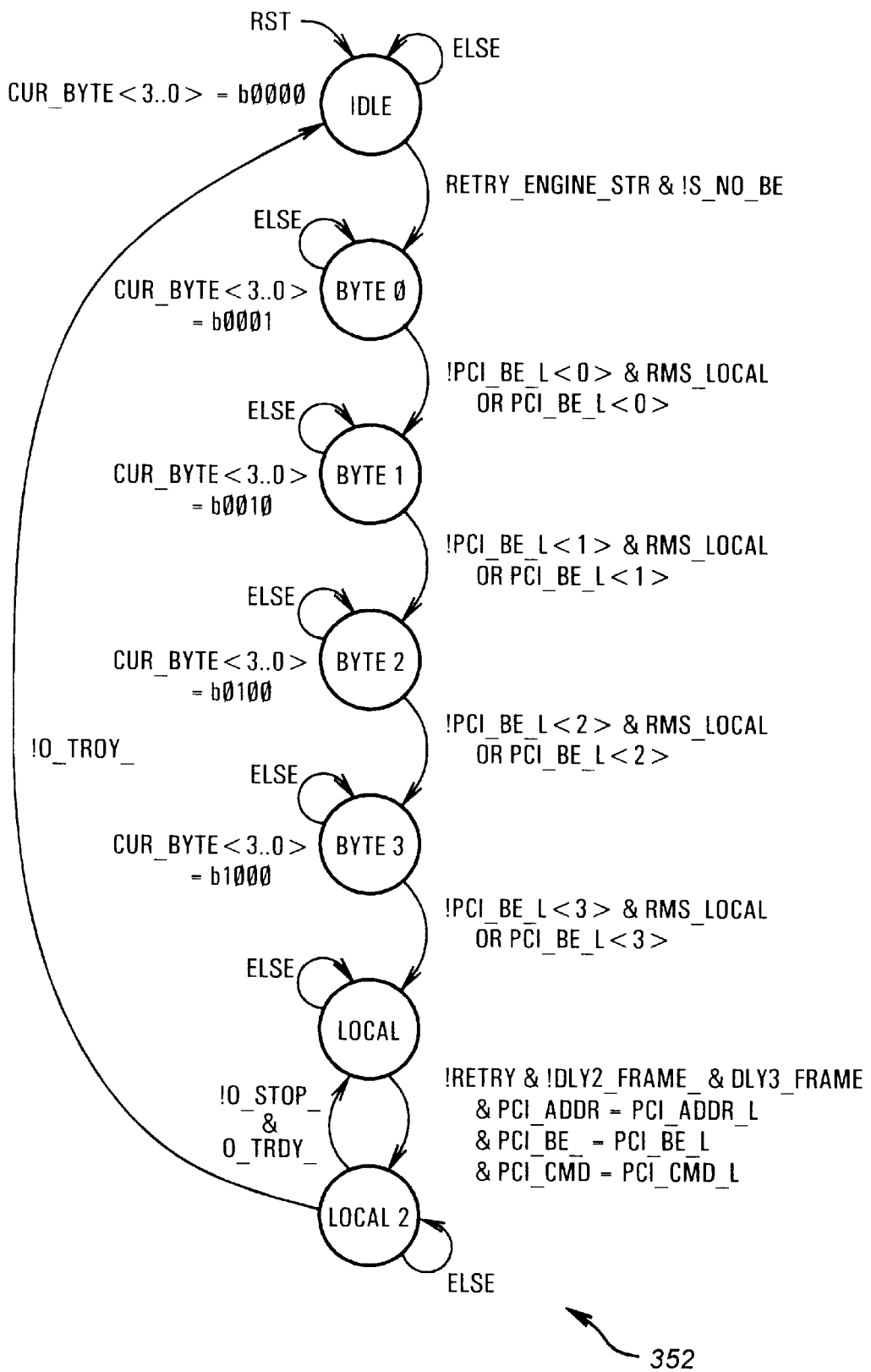
FIG. 6 is a state diagram illustrating operation of the double word state machine of FIG. 5.

Now referring to FIG. 6, the doubleword state machine 352 tracks the data phases of the second write operation. When a PCI reset occurs, indicated by the assertion of a RST signal, the double word state machine 352 enters an IDLE state. The state machine 352 remains in the IDLE state until the RETRY_ENGINE_STR signal is asserted and a S_NO_BE signal is negated. The assertion of the S_NO_BE signal indicates that the byte enable signals on the PCI bus 114 are deasserted. The assertion of these two signals indicates the bus agent has relinquished control of the PCI bus 114 after the PCI slave logic 210 has furnished the known retry sequence to abort the first write operation.

Upon this occurrence, the state machine 352 transitions from the IDLE state to a BYTE0 state. In the BYTE0 state, the state machine 352 sets the CUR_BYTE<3..0> signal equal to "b0001." This indicates that the base address of the high or low floppy drive register address range has a byte of data on the PCI bus 114 during the second write operation. The state machine 352 examines a latched byte enable signal PCI_BE_L<0> from the first write operation to determine whether a byte of floppy register data is to be transferred in the doubleword of the current data phase.

If the least significant latched byte enable signal PCI_BE_L<0> is asserted, or low, and the RMS_LOCAL signal is asserted, then a byte of floppy register data has been transferred and the state machine 352 transitions from the BYTE0 state to the BYTE1 state.

If the PCI_BE_L<0> signal is deasserted, then no byte of data is being transferred during the current data phase. Thus, the state machine 352 transitions to the BYTE1 state on the next positive edge of the CLK signal.

The transition to BYTE2, BYTE3 and a LOCAL state are analogous to the above-described transition. Each one of the BYTE0, BYTE1, BYTE2, and BYTE3 states monitors for the write of the first, second, third, and fourth bytes of data to the double word address of the second write operation. For the BYTE1 state, the CUR_BYTE<3..0> signal is set equal to "b0010;" for the BYTE2 state, the CUR_BYTE<3..0> signal is set equal to "b0100;" and for the BYTE3 state, the CUR_BYTE<3..0> signal is set equal to "b1000."

The double word state machine 352 transitions from the BYTE3 state to a LOCAL state. In the LOCAL state, the state machine 352 awaits the retried first write operation by the bus agent. When the retried first write operation is identified, then the state machine 352 transitions into a LOCAL2 state.

The state machine 352 identifies the retried first write operation by monitoring several conditions. The retried first write operation is identified when the RETRY signal negated, the current PCI address signals PCI_ADDR<31..0> are equal to the latched first write operation PCI address signals PCI_ADDR_L<31..0>; the current PCI byte enable signals PCI_BE_<3..0> are equal to the latched first write operation PCI byte enable signals PCI_BE_L<3..0>; and the current PCI command signals PCI_CMD<3..0> are equal to the latched first write operation PCI command signals PCI_CMD_L<3..0>. When this conditions are met, the state machine 352 transfers from the LOCAL state to the LOCAL2 state.

The PCI slave logic 210 furnishes a PCI STOP signal, O_STOP_, and a PCI TRDY_ signal O_TRDY, to the PCI bus 114. If in the LOCAL2 state the O_STOP signal is asserted, or low, and the O_TRDY_signal is deasserted, or high, then the state machine 352 transitions from the LOCAL2 state back to the LOCAL state. This indicates the occurrence of the known retry sequence on the PCI bus 114, and the first write operation must once again be retried and detected by the state machine 352.

If the O_TRDY signal is asserted this indicates the retried first write operation was accepted by the PCI slave logic 210a; therefore, when this occurs, the state machine 352 transitions from the LOCAL2 state back to the IDLE state. Otherwise, the state machine 352 remains in the LOCAL2 state until the retried first write operation is finished.

To summarize, the double word state machine 352 interacts with the retry state machine 350 to track the second write operation and the retried first operation of the shadowing cycle. Once the bus agent relinquishes control of the PCI bus 114 after the aborted first write operation, the state machine begins monitoring the second write operation.

The state machine 352 indicates which byte of the addressed double word is being written to in the second write operation through the CUR_BYTE<3..0> signal. The state machine 352 tracks the cycles of the data phase of the second write operation through the BYTE0—BYTE3 states. The LOCAL state is used to monitor the PCI bus 114 for the beginning of the retried first write operation, and the LOCAL2 state is used to await completion of the retried first write operation.

ii. The State Diagram of the Retry State Machine

Figure 7:
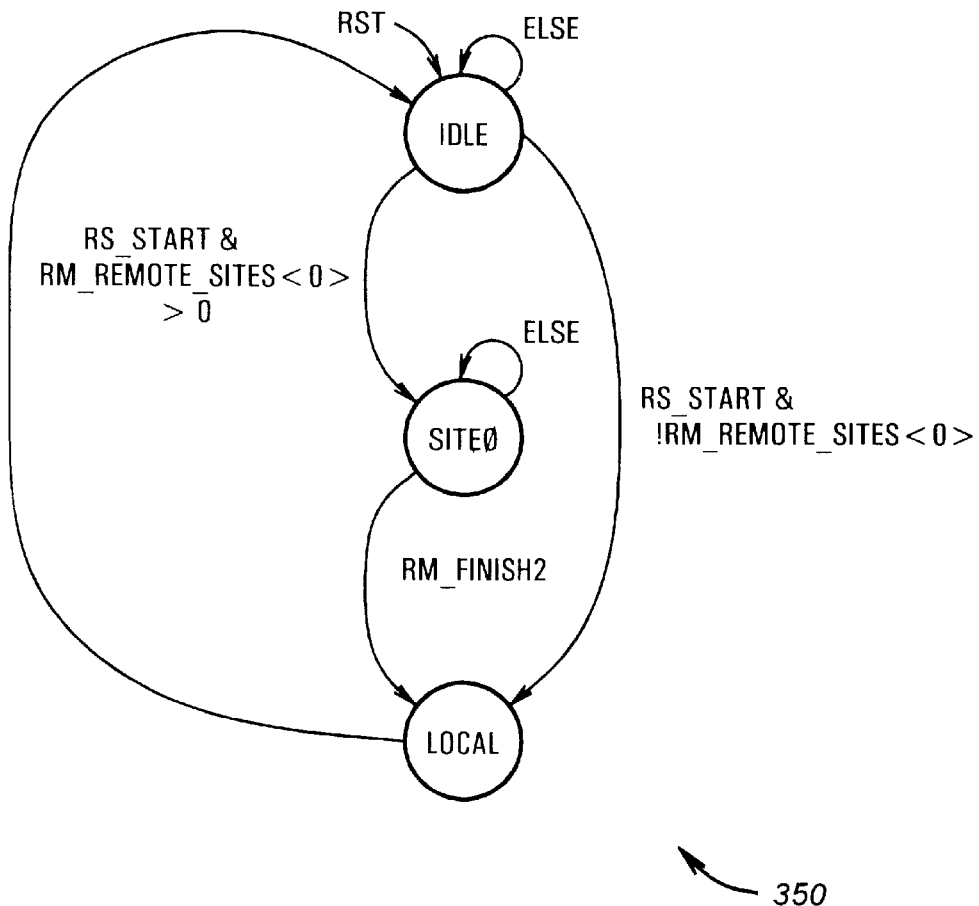
FIG. 7 is a state diagram illustrating operation of the retry master state machine of FIG. 5.

Shown in FIG. 7 is a state diagram illustrating operation of the retry engine state machine 350. On the assertion of the PCI reset signal RST, the state machine 350 enters the IDLE state.

If the RS_START signal is asserted and the RM_REMOTE_SITES<0> signal is high, then this indicates the beginning of the second write operation. If this occurs, then the state machine 350 transitions from the IDLE state to a SITE0 state. The state machine 350 remains in the SITE0 state until the received RM_FINISH2 signal is asserted.

When the RM_FINISH2 signal is asserted, then the state machine 350 transitions from the SITE0 state to the LOCAL state. On the next positive edge of the CLK signal, the state machine 350 transitions from the LOCAL state to the IDLE state.

In the IDLE state, if the RS_START signal is asserted and the RM_REMOTE_SITES<0> signal is low, indicating a write operation to a read only floppy drive register, then the state machine 350 transitions from the IDLE state to the LOCAL state. Otherwise, the state machine 350 remains in the IDLE state.

Thus, in summary, the state machine 350 monitors the PCI bus 114 for completion of the second write operation in the SITE0 state. The state machine 350 transitions to the LOCAL state either upon completion of the second write operation or upon a failed first write operation to a read only floppy drive register.

iii. The Generation of the RS_START Signal

Figure 8:
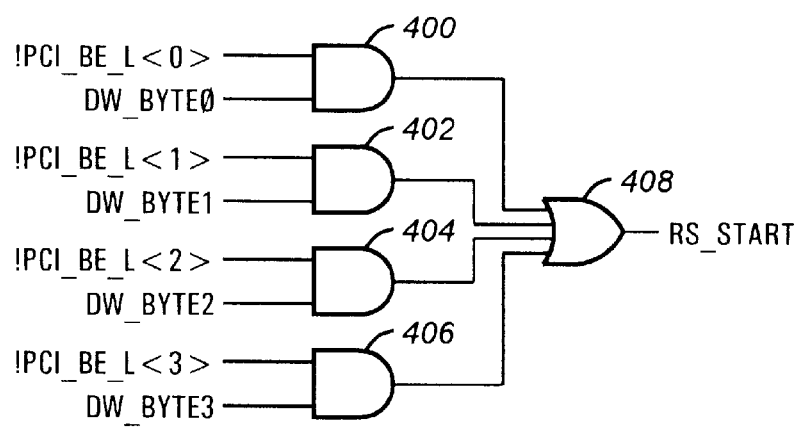
FIG. 8 is a schematic diagram illustrating logic to aid in the tracking of the second write operation.

Shown in FIG. 8 is logic which generates the RS_START signal. The output of an OR gate 408 furnishes the RS_START signal. The inputs of the OR gate 408 receive the outputs of AND gates 400, 402, 404 and 406. The inputs of the AND gates 400–406 receive signals DW_BYTE0, DW_BYTE1, DW_BYTE2 and DW_BYTE3 which, when individually asserted, indicate that the double word state machine 352 is in the BYTE, BYTE1, BYTE2, or BYTE3 states, respectively. These signals are furnished by the double word state machine 352.

The inputs to the AND gate 400 are the inverted PCI BE_L<0> signal and the DW_BYTE0 signal. The inputs to the AND gate 402 are the inverted PCI_BE_L<1> signal and the DW_BYTE1 signal. The inputs to the AND gate 404 are the inverted PCI_BE_L<2> signal and the DW_BYTE2 signal. The inputs to the AND gate 406 are the inverted PCI_BE_L<3> signal and the DW_BYTE3 signal.

Thus, the RS_START signal is asserted if there is data on the PCI bus 114 during the appropriate cycle of the data phase of the second write operation driven by the retry bus master logic 206a.

iv. Positive Decode Logic Interface

Figure 9:
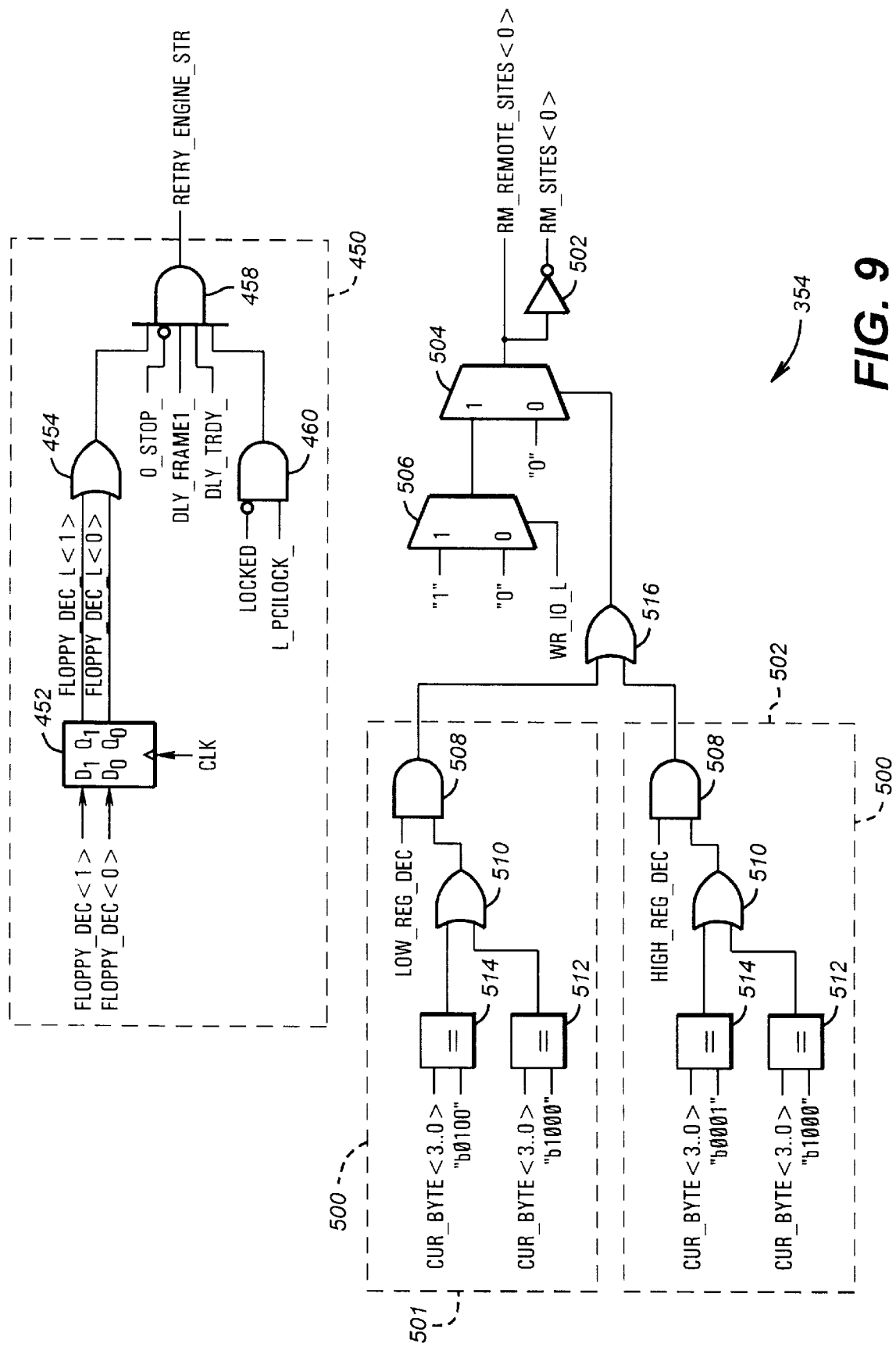
FIG. 9 is a schematic diagram illustrating the design and operation of the positive decode logic interface of FIG. 5.

Shown in FIG. 9 is circuitry to generate the RETRY_ENGINE_STR signal used to indicate abortion of the first write operation by the bus agent. The RETRY_ENGINE_STR is provided by the output of an AND gate 458. A D-type flip flop 452 receives the least two significant FLOPPY_

DEC<2..0> signals as its D inputs and as outputs provides corresponding synchronized signals FLOPPY_DEC_L<1..0> clocked by the CLK signal.

The FLOPPY_DEC_L<1..0> signals are both provided as inputs to an OR gate 454. The output of the OR gate 454 is asserted if one of the FLOPPY_DEC_L<1..0> signals is asserted, indicating that the positive decode logic 200a has detected a floppy drive register address on the in, PCI bus 114.

The output of the OR gate 454 is provided to one input of an AND gate 458. The AND gate 458 further receives the inverted O_STOP signal, a DLY_FRAME1 signal, a DLY_TRDY_ signal, and the output of an AND gate 460. The DLY_FRAME1 signal is the PCI FRAME_signal delayed by one cycle of the CLK signal. The DLY_TRDY signal is the PCI TRDY_signal delayed by one cycle of the CLK signal.

The AND gate 460 receives as its inputs an inverted ISA LOCKED signal and a latched PCI LOCKED signal L_PCILOCK_. When a floppy drive register address is presented on the PCI bus 114 and a retry of the first write operation on the PCI bus 114 is detected, the RETRY_ENGINE_STR signal is asserted, beginning the shadowing cycle.

Also shown in FIG. 9 is decode circuitry 501 which decodes the low range of floppy drive register addresses. Decode circuitry 503 decodes the high range of floppy drive register addresses. Both the circuit 503 and the circuit 501 are of common design 500.

Circuitry is also shown to generate the RM_REMOTE_SITES<0> and the RM_SITES<0> signals. This circuitry includes a multiplexor 506 which receives a latched WR_IO_L signal at its select input. When the WR_IO_L signal is asserted, this indicates a write operation on the PCI bus 114, and when the WR_IO_L signal is negated, this indicates a read operation on the PCI bus 114. The zero input of the multiplexor 506 is driven low; the one input the muitiplexor 506 is driven high. The output of the multiplexor 506 is provided to the one input of a multiplexor 504.

The zero input of the multiplexor 504 is driven low. The select input of the multiplexor 504 is connected to the output of an OR gate 516. The output of the multiplexor 504 furnishes the RM_REMOTE_SITES<0> signal. An inverter 502 receives the RM_REMOTE_SITES<0> signal and provides the RM_SITES<0> signal.

Now referring to remaining decode circuitry, the outputs of an AND gate 508 from decode circuits 501 and 503 are connected to the inputs of the OR gate 516. One INPUT of the AND gate 508 is connected to the output of an OR gate 510. One input of the OR gate 510 is connected to the output of an equal circuit 514, and the other input of the OR gate 510 is connected to the output of an equal circuit 512. One input of each of the equal circuits 514 and 512 receives the CUR_BYTE<3..0> signals.

The remaining signals received by the decode circuitry 500 furnish the decoding for the particular register address range being decoded. In the decode circuit 501 the AND gate 508a receives a LOW_REG_DEC signal as its other input. The LOW_REG_DEC signal is asserted when the FLOPPY_DEC<2..0> signals are equal to "b101" and negated otherwise. The equal circuit 514a receives as a second input a four bit signal representative of "b0100." The equal circuit 512a receives as a second input a four bit signal representative of "b1000." While the decode circuit 500a could decode up to four register addresses for positive decoding and shadowing, in the described embodiment, only two registers are decoded in the lower address range, as selected by the inputs to the equal circuits 514a and 512a.

Similarly, in the decode circuit 503, the other input of the AND gate 508b receives a HIGH_REG_DEC signal. The HIGH_REG_DEC signal is asserted when the FLOPPY_DEC<2..0> signals are equal to "b110." The other input of the equal circuit 514b receives a four bit signal representative of "b0001." The other input of the equal circuit 512b receives a four bit signal representative of "b100." Thus, the circuitry 500b decodes two upper floppy drive register addresses through the equal circuits 512b and 514b. Again although the circuit decodes two registers in the upper floppy drive register address range, up to four register addresses could be decoded in alternative embodiments.

To summarize, the positive decode logic interface 354 furnishes the RETRY_ENGINE_STR signal, which when asserted indicates the abortion of the first write operation. The positive decode logic interface 354 also furnishes the RM_REMOTE_STRS<0> and the RM_SITES<0> signals, which are used to indicate detection of the first write operation to a writeable floppy drive register.

v. The PCI Slave Interface Logic

Figure 10:
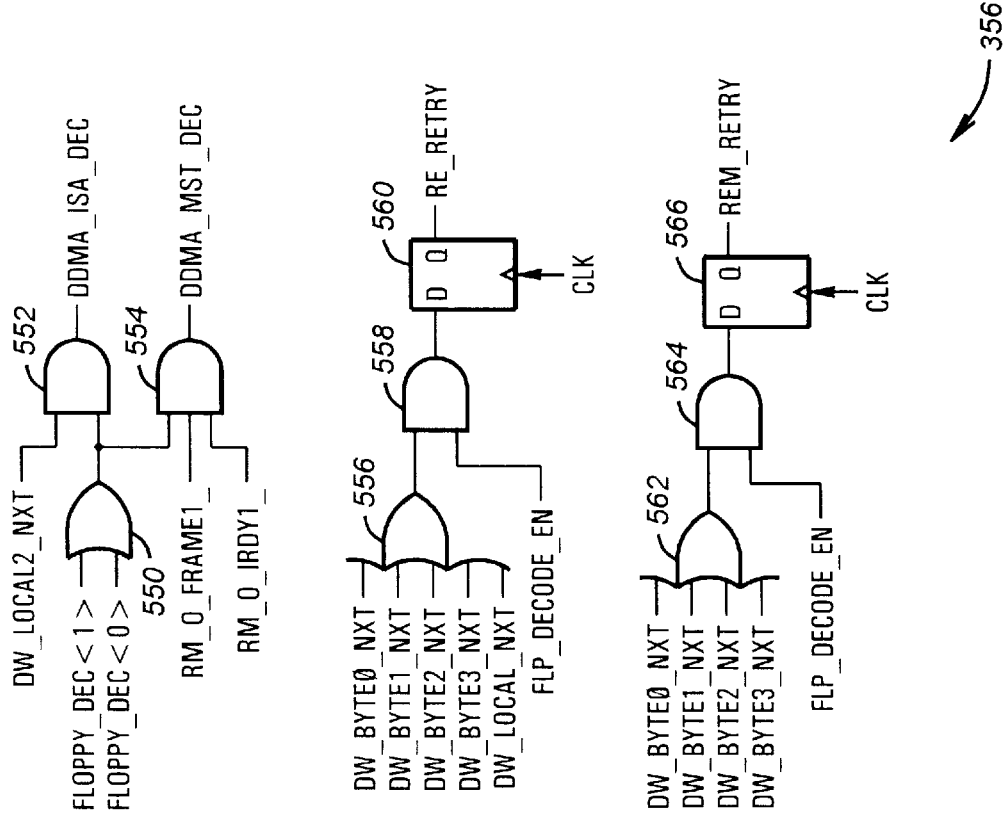
FIG. 10 is a schematic diagram illustrating the design and operation of the PCI slave interface logic of FIG. 5.

Shown in FIG. 10 is a circuit schematic that illustrates the design operation of the PCI slave interface logic 356. The FLOPPY_DEC<1> signal and the FLOPPY_DEC<0> signal are provided as inputs to an OR gate 550. The output of the OR gate 550 is provided as one input to an AND gate 554, which outputs the DDMA_MST_DEC signal.

A second input of the AND gate 554 receives a RM_O_FRAME1_signal, which reflects the PCI FRAME signal furnished by the retry bus master logic 206a. The third input of the AND gate 554 receives RM_O_TRDY1_signal, which reflects the PCI TRDY_finished by the retry bus master logic 206d. Thus, when one of the floppy drive register addresses has been detected on the PCI bus 114 and the retry bus master logic 206a is not driving the current operation on the PCI bus 114, then the DDMA_MST_DEC signal is asserted. The DDMA_MST_DEC signal is otherwise negated.

The output of the OR gate 550 is further furnished to the input of an AND gate 552, which outputs the DDMA_ISA_DEC signal. The other input of the AND gate 552 receives a DW_LOCAL2_NXT signal from the double word state machine 352. The state machine 352 asserts the DW_LOCAL2_NXT signal when the next state of the state machine 352 is the LOCAL state. The DW_LOCAL2_NXT signal is otherwise negated.

When asserted, the DW_LOCAL2_NXT signal indicates the retried first write operation has been identified by the state machine 352. The DW_LOCAL2_NXT signal remains asserted until the completion of the retried first write operation. The DW_LOCAL2_NXT signal is otherwise false.

Thus, when one of the floppy drive register addresses is detected on the PCI bus 114 and the bus agent is driving the retried first write operation, the DDMA_ISA_DEC signal is asserted. The DDMA_ISA_DEC signal is negated otherwise.

A D-type flip flop 560 provides the RE_RETRY signal as its output. The flip flop 560 is clocked by the positive edge of the CLK signal. The input of the flip flop 560 is connected to the output of an AND 558, which receives the floppy decode enable signal FLP_DECODE_EN as one of is inputs. The other input of the AND gate 558 is connected to the output of an OR gate 556.

The OR gate 556 receives as inputs signals indicative of the next state of the state machine 352. When asserted, these signals indicate the associated next state. The DW_BYTE0_NXT is associated with the BYTE0 state; the DW_BYTE1_NXT signal is associated with BYTE1 state; the DW_BYTE2_NXT signal is associated with the BYTE2 state; the DW_BYTE3_NXT signal is associated with the BYTE3 state; and the DW_LOCAL_NXT signal is associated with the LOCAL state. Thus, for the bridge circuit 122a, the RE_RETRY signal is asserted when the retry bus master logic 206a is driving the second write operation and before the retried first write operation is detected on the PCI bus 114.

A D-type flip flop 566 provides as its output the REM_RETRY signal. The flip flop 566 is clocked by the positive edge of the CLK signal. The D input of the flip flop 566 is connected to the output of an AND gate 564, which receives as one of its inputs the floppy decode enable signal FLP_DECODE_EN. The other input of the AND gate 564 is connected to the output of OR gate 562.

The inputs to the OR gate 562 are the DW_BYTE0_NXT, the DW_BYTE1_NXT, the DW_BYTE2_NXT and the DW_BYTE3_NXT signals. Thus, the REM_RETRY signal is asserted when the retry bus master logic 206a is driving the second write operation on the PCI bus 114.

To summarize, the PCI slave interface logic 356 furnishes the RE_RETRY and REM_RETRY signals to the PCI slave logic 210. The RE_RETRY signal is asserted when the retry bus master logic 206a is driving the second write operation and also asserted before the retried first write operation is driven by the bus agent. The REM_RETRY signal is asserted when the retry bus master logic 206a is driving the second write operation on the PCI bus 114. The DDMA_ISA_DEC and DDMA_MST_DEC signals are used to identify the first and second write operations.

vi. The Retry Engine Interface Logic

Figure 11:
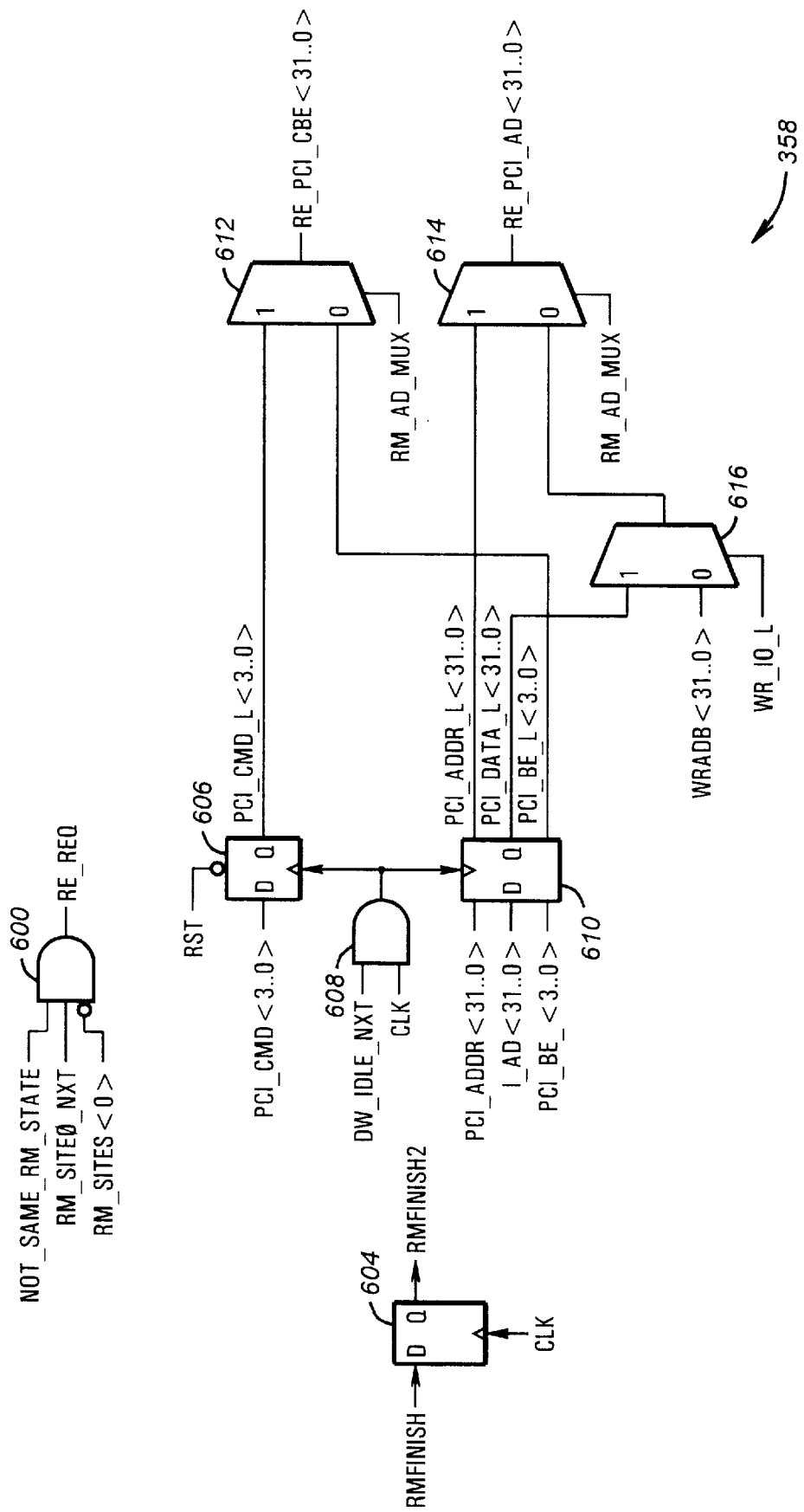
FIG. 11 is a schematic diagram illustrating the design and operation of the retry engine interface logic of FIG. 5.

Shown in FIG. 11 is the retry engine interface logic 358. An AND gate 600 furnishes the RE_REQ signal. The AND gate 600 receives at one input the inverted RM_SITES<0> signal. At another input the AND gate 600 receives a RM_SITE0_NXT signal. The RM_SITE0_NXT signal is asserted by the retry master state machine 350 to indicate the retry master state machine 350 will enter the SITE0 state on the next positive edge of the CLK signal. The RM_SITE0_NXT signal is negated otherwise.

At its third input the AND gate 600 receives a NOT_SAME_RM_STATE signal. The NOT_SAME_RM_STATE signal is asserted if the retry master state machine 350 does not remain in the same state on the next positive edge of the CLK signal and negated otherwise. Thus, when the retry state machine 350 transitions from the IDLE state to the SITE0 state and the bus agent has attempted the first write operation on the PCI bus 114, the RE_REQ signal is asserted which begins the shadowing cycle. The RE_REQ signal is negated otherwise.

Also shown in FIG. 11 is a D-type flip flop 604 which furnishes the RMFINISH2 signal at its output. The flip flop 604 is clocked on the positive edge of the CLK signal, and the flip flop 604 receives the RMFINISH signal at its input which is provided by the retry bus master logic 206.

A D-type flip flop 606 provides the latched first write operation PCI command signals PCI CMD_L<3..0> at its non-inverting outputs. The flip flop 606 receives the latched current PCI command signals PCI_CMD<3..0> signals at its D inputs. The flip flop 606 is clocked by the output of an AND gate 608.

The AND gate 608 receives a DW_IDLE_NXT signal at one of its inputs and the CLK signal at its other input. The DW_IDLE_NXT signal is asserted when the next state of the double word state machine 352 is the IDLE state. The DW_IDLE_NXT signal is negated otherwise. On the positive edge of the CLK signal when the DW_IDLE_NXT signal is asserted, the flip flop 606 is clocked. Thus, the PCI_CMD_L<3..0> signals are equal to the command signals PCI_CMD<3..0> as provided during the first write operation.

A D-type flip flop 610 furnishes the latched first write operation PCI address lines PCI_ADDR_L<31..0>, data lines PCI_DATA_L<31..0> and the byte enable PCI_BE_L<3..0> signals at its non-inverting outputs. The flip flop 610 receives at its D inputs the current PCI address PCI_ADDR<31..0>, the current data drives I_AD<31..0> and the byte enable PCI_BE<3..0> signals at its inputs. The current latched data lines of the PCI bus 114 are represented by I_AD<31..0>. The clock input of the flip flop 610 is connected to the output of the AND gate 608.

A multiplexor 612 furnishes the RE_PCI_CBE<31..0> signals at its output. The multiplexor 612 receives the RM_AD_MUX signal at its select input. The multiplexor 612 receives the PCI_BE_L<3..0> signals at its zero input. The multiplexor 612 receives the PCI_CMD_L<3..0> signals at its one input. Thus, during the address phase of the second write operation by the retry bus master logic 206a, the multiplexor 612 furnishes the PCI_CMD_L<3..0> signals at its output, and during the data phase of the second write operation by the retry bus master logic 206a, the multiplexor 612 furnishes the PCI_BE_L<3..0> signals at its output. The output signals of the multiplexor 612 are furnished to the PCI bus 114 through the interface circuitry 214.

A multiplexor 614 furnishes the RE_PCI_AD<31..0> address fines at its output. The select input of the multiplexor 614 receives the RM_AD_MUX signal. The one input of the multiplexor 614 receives the PCI_ADDR_L<31..0> signals. The zero input of the multiplexor 614 receives the output of a multiplexor 616.

The select input of the multiplexor 616 receives the WR_IO_L signal. The zero input of the multiplexor 616 receives the ISA write data signals, represented by WRADB<31..0>, from the ISA bus controller 212. The one input of the multiplexor 616 receives the PCI_DATA_L<31..0> signals. Thus, during either a write or a read operation on the PCI bus 114, the multiplexor 614 furnishes the PCI_ADDR_L<31..0> signals to the interface circuitry 214 which furnishes these signals to the PCI bus 114 during the address phase. During the data phase, if the bus agent performed a read operation to the floppy drive registers, then the data from these registers represented by WRADB<31..0> signals is provided to the PCI bus 114. However, if the bus agent attempted to performed the first write operation to the floppy drive registers, then the latched first write operation data lines PCI_DATA_L<31..0> are furnished to the PCI bus 114 during the data phase of the second write operation through the interface circuitry 214.

To summarize, the retry engine interface logic 358 furnishes the RE_REQ signal, which is used to start the second write operation. The retry engine interface logic 358 also provides the command, byte enable, address and data lines to the PCI bus 114, through the interface circuitry 214, during the second write operation.

C. The PCI Slave Logic i. The Generation of the Retry Signal

Figure 12:
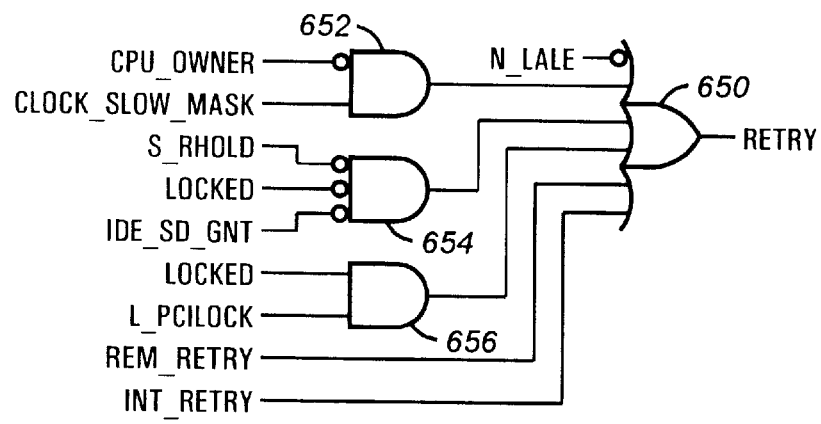
FIG. 12 is a schematic diagram illustrating the generation of the retry signal used to mask bus requests from the arbiter of FIG. 2.

Shown in FIG. 12 is the logic to generate the RETRY signal which is used to mask the bus request from the bus agent until the completion of the second write operation. The RETRY signal is furnished by the output of an OR gate 650. One input of the OR gate 650 receives an inverted N_LALE signal. The N_LALE signal is an enable signal for latching the PCI address by the latch 202. When the N_LALE signal is negated, internal write buffers of the bridge circuit 122 (not shown) are full and the bridge circuit 122 temporarily suspends any data passing between the PCI bus 114 and the ISA bus I.

Another input of the OR gate 650 is connected to the output of an AND gate 652. The AND gate 652 receives a CPU_OWNER signal at one of its inputs. Another input of the AND gate 652 receives a CLOCK_SLOW_MASK signal. The CPU_OWNER signal, when asserted, indicates that the CPU 100 is the owner of the PCI bus 114. The CPU_OWNER signal is negated otherwise. The CLOCK_SLOW_MASK signal, when asserted, indicates to retry every bus agent on the PCI bus 114 except for the CPU 100. The CLOCK_SLOW_MASK signal is otherwise negated.

Another input of the OR gate 650 is connected to the output of an AND gate 654. One input of the AND gate 654 receives an inverted S_RHOLD signal. The S_RHOLD signal, when asserted, indicates a refresh cycle hold acknowledge, and the S_RHOLD signal is negated otherwise. Another input of the AND gate 654 receives an inverted ISA bus LOCKED signal. A third input of the AND gate 654 receives an inverted IDE_SD_GNT signal which is asserted when the IDE interface 137 or the interface 146 owns the ISA bus I. The IDE_SD_GNT signal is negated otherwise. Thus, the output of the AND gate 654 is asserted if a refresh cycle is pending and negated otherwise.

Another input of the OR gate 650 is connected to the output of an AND gate 656. One input of the AND gate 656 receives the ISA bus LOCKED signal. The other input of the AND gate 656 receives a L_PCILOCK signal, a latched PCI LOCKED signal. Thus, the output of the AND gate 656 is asserted when the bridge 122 is locked from accesses from the PCI bus 114.

Another input of the OR gate 650 receives the REM_RETRY signal. Another input of the OR gate 650 receives a INT_RETRY signal which is asserted when an interrupt cycle on the PCI bus 114 needs to be retried and negated otherwise.

Thus, the RETRY signal is asserted if either the write buffer of the bridge circuit 122 is fill, a non-CPU 100 cycle needs to be retried, the bridge circuit 122 is locked from accessing the PCI bus 114, a refresh cycle is pending, a shadowing cycle is beginning or an interrupt cycle on the PCI bus 114 needs to be retried.

ii. State Diagram of the PCI Slave Logic

Figure 13:
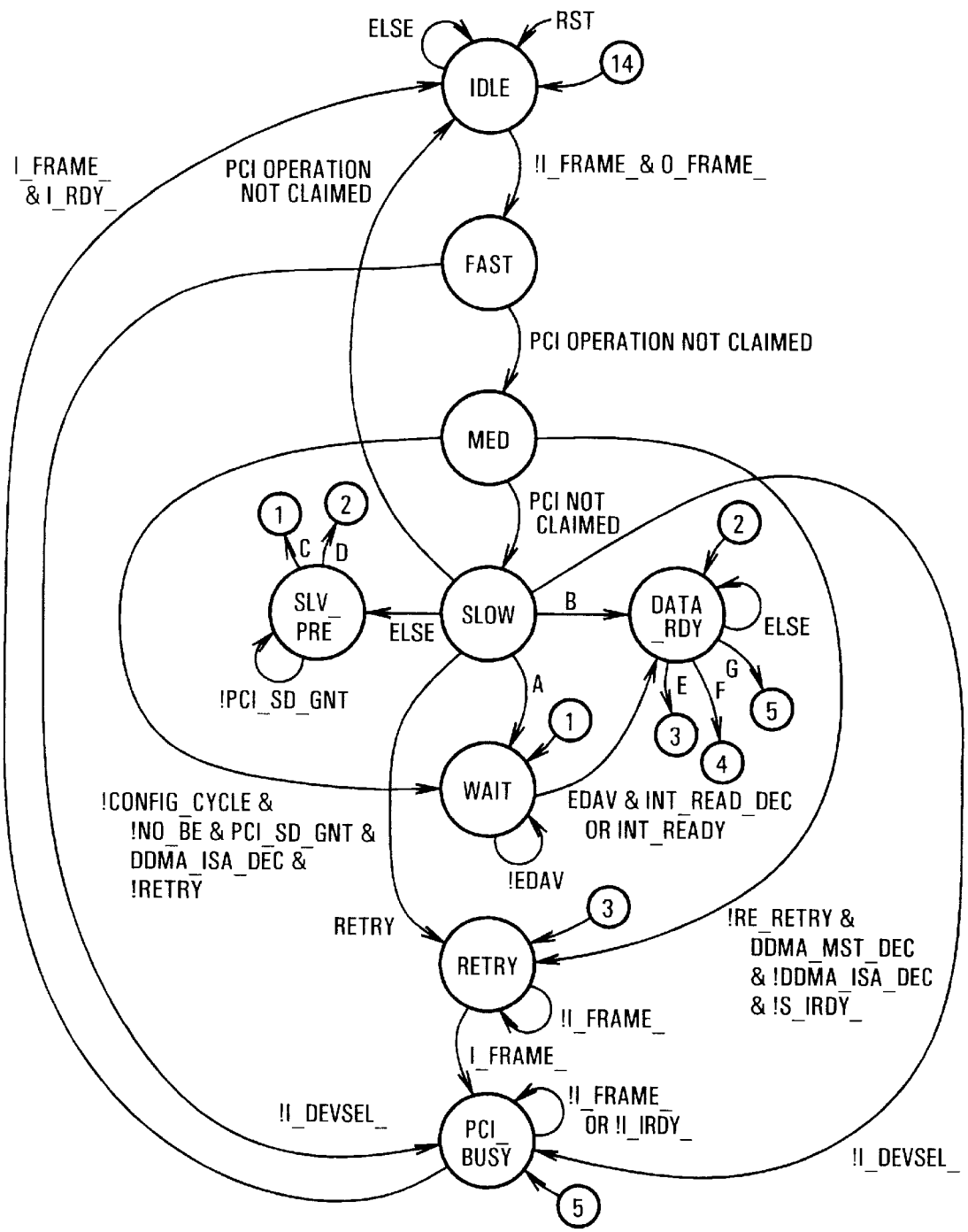
FIG. 13 is a state diagram illustrating operation of the PCI slave logic of FIG. 2.

Shown in FIG. 13 is a state diagram illustrating operation of the PCI slave logic 210 for the purposes of the present invention. The PCI slave logic 210 enters an IDLE state when the RST signal is asserted which indicates a PCI reset. The PCI slave logic 210 remains in the IDLE state until the PCI bus 114 FRAME_signal, I_FRAME_, is asserted, or pulled low, and an O_FRAME_signal is deasserted, or is high. The O_FRAME_signal is a PCI FRAME_signal furnished by the retry bus master logic 206. Upon the occurrence described above, the PCI slave logic 210 transitions from the IDLE state to a FAST decode state.

If a PCI DEVSEL_signal I_DEVSEL_, is asserted, or pulled low, which indicates a bus agent has claimed the present PCI bus 114 operation, then the PCI slave logic 210 transitions from the FAST decode state to a PCI_BUSY state. If the PCI operation is not claimed, then the PCI slave logic 210 transitions from the FAST state to a MED decode state.

In the MED state, the PCI slave logic 210 determines whether it should retry the current cycle on the PCI bus 114. If the RE_RETRY signal is deasserted, the DDMA_MST_DEC signal is asserted, the DDMA_ISA_DEC signal is deasserted and a PCI IRDY_signal, S_IRDY_, is asserted, or pulled low, then the PCI slave logic 210 transitions from the MED state to the RETRY state. During the RETRY state, the PCI slave logic 210a furnishes the known retry sequence.

In the MED decode state, the PCI slave logic 210 monitors the PCI bus 114 for the retried first write opration. A CONFIG_CYCLE signal is asserted if a configuration cycle is underway on the PCI bus 114. The CONFIG_CYCLE signal is negated otherwise. A NO_BE enable signal is asserted to indicate no byte enables are asserted on the PCI bus 114. The NO_BE signal is deasserted otherwise.

If the CONFIG_CYCLE signal and the NO_BE signal are both deasserted; the ISA bus controller 212 has been granted control of the ISA bus I as indicated by the assertion of a PCI_SD_GNT signal from the arbiter 208; the DDMA_ISA_DEC signal is asserted; and the RETRY signal is deasserted, then the PCI slave logic 210 transitions from the MED decode state to a WAIT state. If the PCI operation is not claimed, then the PCI slave logic 210 transitions from the MED state to a SLOW decode state.

The PCI slave logic 210b of the bridge circuit 122b reaches the SLOW state during the shadowing cycle which is the state during which the bridge circuit 122b subtractively decodes the second write opration. The PCI slave logic 210 transitions from the SLOW decode state to a PCI_BUSY state if the device select PCI DEVSEL_signal, I_DEVSEL, is asserted, or pulled low.

The PCI slave logic 210b performs subtracting decoding in the SLOW decode state. A subtractive decode enable signal SUB_DECODE_EN is furnished to the PCI slave logic 210b from a configuration register. The SUB_DECODE_EN signal is always asserted for the bridge circuit 122b and asserted for the bridge circuit 122a when the laptop unit L is not docked to the expansion base unit E.

The PCI slave logic 210 also receives a PW_R_signal. The deassertion of the PW_R_ signal indicates a PCI write operation, and the assertion, or pulling low, of the PW_R_ signal indicates a PCI read operation. The PCI slave logic 210 further receives, a NO_POST signal. The assertion, or pulling high, of the NO_POST signal indicates the write buffers are full, and the NO_POST signal is negated otherwise.

If the SUB_DECODE_EN signal is asserted; the RETRY signal is negated; the S_NO_BE signal is negated; the PCI_SD_GNT signal is asserted; and either the NO_POST signal is asserted or an I/O cycle is indicated by the assertion of the PM_IO_signal, then the PCI slave logic 210 transitions from the SLOW decode state to the WAIT state.

If these conditions do not exist, then the PCI slave logic 210 checks whether data is available on the PCI bus 114 for the floppy drive registers. In this case, no byte enables are asserted on the PCI bus 114 as indicated by the assertion of a S_NO_BE signal. Alternatively, the operation on the PCI bus 114 can be a write operation with no posting required as indicated by the deassertion of the PW_R_signal; the negation of the NO_POST signal; and the assertion of the PCI_SD_GNT signal. If neither of the above conditions occur in the SLOW decode state, then the PCI slave logic 210 transitions from the SLOW state to a slave preemption state SLV_PRE.

In the slave preemption state SLV_PRE, the PCI slave logic 210 determines whether the bridge circuit 122 has access to the ISA bus I. This is indicated by the negation of the PCI_SD_GNT signal. If the bridge circuit 122 does not have access to the ISA bus I, the PCI slave logic 210 remains in the SLV_PRE state.

If the ISA bus controller 212 has been granted control of the ISA bus I, then the PCI slave logic 210 determines whether the PCI slave logic 212 will have to wait for access to the ISA bus I. Wait states occur either a write operation is pending as indicated by the deassertion of the PW_R_ signal; the write posting buffers are not empty as indicated by the deassertion of the NO_POST_signal; or retry engine write posting buffers are not empty as indicated by the deassertion of a RE_NO_POST_signal then the slave logic 210 transitions from the SLV_PRE state to the WAIT state.

If none of the above conditions occur in the SLV_PRE state, the slave logic 210 determines whether the data on the PCI bus 114 is ready. This occurs for a write operation on the PCI bus 114 as indicated by the deassertion of the PW_R_ signal; the assertion of the NO_POST_signal or the negation of the RE_NO_POST signal. If this occurs, then the PCI slave logic 210 transitions from the SLV_PRE state to the DATA_RDY state.

In the DATA_RDY state, the PCI slave logic 210 first examines the PCI bus 114 signals to determine if a retry is needed. The PCI bus 114 has associated signals well-known to those skilled in the art: FRAME_, IRDY_, and TRDY_. If a PCI FRAME_signal I_FRAME_, is asserted and the PCI IRDY_signal, I_IRDY, is asserted, then the PCI slave logic 210 transitions from the DATA_RDY to the RETRY state.

If in the DATA_RDY state the above-described conditions do not occur and the PCI FRAME_signal I_FRAME_signal is deasserted, the PCI IRDY_signal, I_IRDY, IRDY_ is asserted and a PCI write operation is indicated by the deassertion of the PW_R_signal, then the PCI slave logic 210 transitions from the DATA_RDY state to the IDLE state.

If none of the above conditions occur during the DATA_RDY state, then the PCI slave logic 210 determines whether the I_FRAME signal is deasserted, the I_IRDY_signal is asserted and the PW_R_signal is asserted which indicates a read operation. If this occurs, then the PCI slave logic 210 transitions from the DATA_RDY state to the PCI_BUSY state.

In the RETRY state, the PCI slave logic 210 monitors the PCI FRAME_signal, I_FRAME_, to determine whether the bus agent that drove the first write operation has relinquished control of the PCI bus 114. If the I_FRAME_ signal is deasserted, then the PCI slave logic 210 transitions from the RETRY state to the PCI_BUSY state. If not, then the PCI slave logic 210 remains in the RETRY state.

The PCI slave logic 210 remains in the PCI_BUSY state until both the PCI FRAME signal, I_FRAME_, and the PCI IRDY_signal, I_RDY_, are concurrently deasserted. This indicates an IDLE condition on the PCI bus 114. If the signals are not both deasserted, then the PCI slave logic 210 remains in the PCI_BUSY state.

To summarize, the PCI slave logic 210a performs positive decoding in the MED state if the second write operation is not being driven on the PCI bus 114. The PCI slave logic 210a positively decodes accesses to the floppy drive registers. If the first write operation is positively decoded, then the PCI slave logic 210a transitions to the RETRY state. The PCI slave logic 210b performs subtractive decoding after the SLOW decode state.

4. Conclusion

In summary, for read operations to a floppy drive register address, the PCI slave logic 210a positively decodes and furnishes the data for the read operation to the PCI bus 114. For write operations, the bridge circuit 122a initiates the shadowing cycle.

To initiate the shadowing cycle, the PCI slave logic 210a furnishes the known retry sequence to the PCI bus 114 when the positive decode logic 200a indicates an access to the floppy drive registers and the retry logic 204a indicates the first write operation. The first write operation is retried, but masked, and the retry bus master logic 206a drives the second write operation, which is subtractively decoded by the bridge circuit 122b.

The retry logic 204a initiates the generation of the second write operation by the retry bus master logic 206a and interacts with the PCI slave logic 210a and the arbiter 208a to mask the bus request from the bus agent until after the second write operation.

After the bus request is unmasked, the bus agent is then granted control of the PCI bus 114. The bus agent can then retry the first write operation which is positively decoded and accepted by the bridge circuit 122a.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of writing from a bus agent to first and second registers through a bus, the first and second registers sharing a common address, the method comprising the steps of:
   performing a first write operation from the bus agent to the common address;
   indicating to the bus agent that the bus agent must retry the first write operation;
   writing to the first register at the common address; and
   writing to the second register at the common address.

2. The method of claim 1 and further comprising the step of inhibiting the retrying of the first write operation until after the step of writing to the first register is performed.

3. The method of claim 2 wherein the step of inhibiting the retrying comprises masking a bus access request of the bus agent from an arbiter.

4. The method of claim 1 wherein the step of indicating to the bus agent that the bus agent must retry the first write operation comprises furnishing a PCI retry sequence.

5. The method of claim 1 wherein the bus agent comprises a PCI bus agent.

6. The method of claim 5 wherein the inhibiting step is initiated by a bridge circuit, the bridge circuit serving as an interface between a PCI bus and another bus.

7. A method of writing from a bus agent to first and second registers through a bus, the method comprising the steps of:
   performing a first write operation from the bus agent to the first register;
   indicating to the bus agent that the bus agent must retry the first write operation;
   inhibiting the bus agent from controlling the bus;
   performing a second write operation to the second register;

writing to the second register;

retrying the first write operation; and writing to the first register.

8. The method of claim 7 wherein the step of indicating comprises furnishing a PCI retry sequence.

9. The method of claim 7 wherein the step of inhibiting comprises masking the bus access request of the bus agent from an arbiter circuit.

10. The method of claim 7 wherein the first and second registers comprise floppy disk registers.

11. The method of claim 7 wherein the first register is coupled to a second bus and wherein the inhibiting step is performed by a bridge circuit which serves as an interface between the bus and the second bus.

12. The method of claim 11 wherein the step of performing a second write operation is performed by the bridge circuit.

13. A method of writing from a bus agent to first and second registers in a computer system, the computer system comprising a first bridge circuit coupled between a first bus and a second bus, the computer system also comprising a second bridge circuit coupled between the first bus and a third bus, the first register being coupled to the second bus and the second register being coupled to the third bus, the first and second registers sharing a common address, the method comprising the steps of:

performing a first write operation from the bus agent to the first register;

decoding the first write operation at the first bridge circuit;

indicating to bus agent that the bus agent must retry the first write operation;

temporarily inhibiting the bus agent from controlling the first bus;

performing a second write to the first bus;

enabling the second bridge circuit to decode the second write;

performing a write operation from the second bridge circuit to the second register through the third bus;

enabling the bus agent to retry the first write operation;

decoding the retried first write operation at the first bridge circuit; and performing a write operation from the first bridge circuit to the first register through the second bus.

14. The method of claim 13 wherein the first and second registers comprise disk drive registers.

15. The method of claim 13 wherein the first bus comprises a PCI bus.

16. The method of claim 15 wherein the second and third buses comprise an ISA buses.

17. The method of claim 13 wherein the steps of decoding the first write operation, indicating to bus agent that the bus agent must retry the first write operation, and temporarily inhibiting the bus agent are initiated by the first bridge circuit.

18. The method of claim 13 wherein the step of indicating to bus agent that the bus agent must retry the first write operation comprises furnishing a known PCI retry sequence.

19. The method of claim 13 wherein the first bridge circuit temporarily inhibits the bus agent from controlling the first bus by masking the bus access request of the bus agent from an arbiter.

20. A computer system which includes a portable computer in combination with an expansion base, the portable computer comprising:

a processor coupled to a first bus;

system memory coupled for access by the processor;

a first bridge circuit coupled between the first bus and a second bus; and a first register coupled for access by the processor through the first bus and the second bus, the first register having a common address;

the expansion base comprising:

an expansion base first bus for coupling to the first bus;

a second bridge circuit coupled between the expansion base first bus and a third bus; and a second register coupled for access by the processor through the first bus, the expansion base first bus and the third bus, the second register having the common address;

wherein the computer system is capable of providing a first write operation on the first bus to the common address and retrying the first write operation in response to a known retry sequence on the bus.

21. The system of claim 20 wherein the first and second registers comprise disk drive registers.

22. The system of claim 21 wherein the first and second registers comprise floppy disk registers.

23. The system of claim 21 and further wherein the portable computer further comprises a first disk drive and wherein the expansion base further comprises a second disk drive.

24. The system of claim 20 wherein the portable computer further comprises:

a ROM coupled to the second bus;

a pointing device coupled to the second bus;

a modem coupled to the second bus; and an audio circuit coupled to the second bus.

25. The system of claim 20 wherein the computer system is further capable of temporarily inhibiting access to the first bus after the step of retrying the first write operation is initiated.

26. A shadowing system for use with a computer system for shadowing write operations to a first register and a second register, the first and second registers coupled to a bus and having a common address, the computer system capable of providing a first write operation on the bus of register data to the common address and retrying the first write operation in response to a known retry sequence on the bus, the shadowing system comprising:

means for detecting the first write operation to the bus of register data to the common address;

means for providing the known retry sequence to the bus when said detector detects the first write operation;

means for providing a second write operation on the bus of the register data to the second register at the common address after the detector detects the first write operation; and means for inhibiting the retrying of the first write operation in response to the known retry sequence until after said write generator completes the second write operation.

* * * * *